United States Patent

La Valle

[15] 3,706,122

[45] Dec. 19, 1972

[54] APPARATUS FOR ASSEMBLING ELECTRICAL COMPONENTS

[72] Inventor: Thomas A. La Valle, Annapolis, Md.

[73] Assignee: Western Electric Company, Incorporated, New York, N.Y.

[22] Filed: Aug. 13, 1971

[21] Appl. No.: 171,623

Related U.S. Application Data

[62] Division of Ser. No. 878,017, Nov. 19, 1969, Pat. No. 3,618,204.

[52] U.S. Cl..............29/203 D, 29/208 C, 29/208 F, 228/18
[51] Int. Cl.........................H01r 43/00, B23p 19/04
[58] Field of Search .29/208 F, 203 R, 203 D, 205 D, 29/208 C; 228/18

[56] References Cited

UNITED STATES PATENTS

| 2,100,502 | 11/1937 | Campbell et al. | 228/18 |
| 3,214,832 | 11/1965 | Schwinghamer | 29/427 |
| 3,400,448 | 9/1968 | Helda et al. | 29/471.1 |
| 3,473,213 | 10/1969 | Brown | 29/203 |
| 3,525,151 | 8/1970 | Pellerin | 29/624 |

*Primary Examiner*—Thomas H. Eager
*Attorney*—E. W. Somers

[57] ABSTRACT

A rotatable turntable having a plurality of workholders spaced about the periphery thereof is indexed to advance each of the workholders successively through each of a plurality of work stations positioned adjacent the periphery of the turntable to assemble electrical components. A first part positioned in one of the workholders at a first work station has the leading end of an insulated wire extending from a supply of wire welded thereto at a second work station, after which the first part is indexed to a third work station without severing the wire extending from the first part to the supply. At the third work station a portion of the wire extending to the first part in the workholder is severed from the supply and the new leading end of the wire is attached to the first part in the next succeeding workholder. The first part is rotated in the first workholder while tensioning the wire extending from and secured to the first part to wind the wire thereon as the workholder is advanced with the turntable through a fourth and a fifth work station to a sixth work station. At the sixth work station a second part is assembled to the first part and, simultaneously, the insulation on a portion of the wire extending from the first part is stripped. At a seventh work station the trailing portion of the wire is welded to a metal cap which is secured to the second part and the strength of the weld is tested, whereafter the electrical component is advanced to a last work station and tested electrically and then sorted.

4 Claims, 42 Drawing Figures

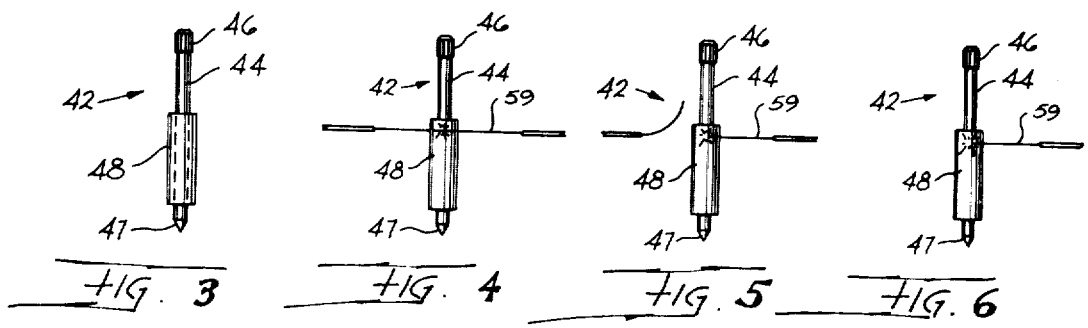
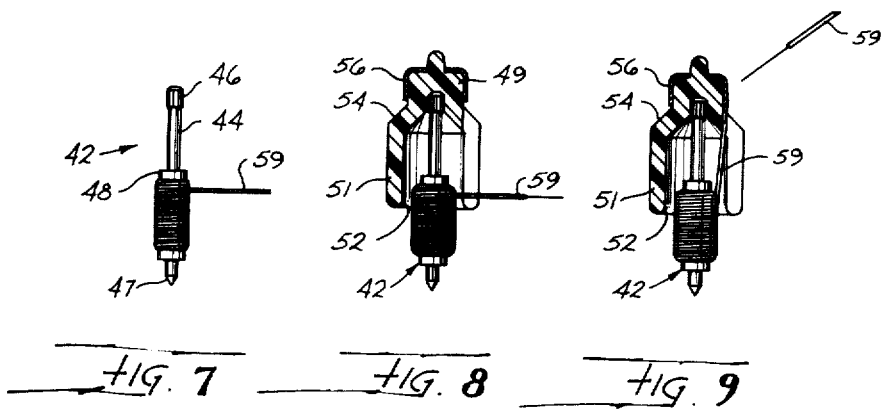
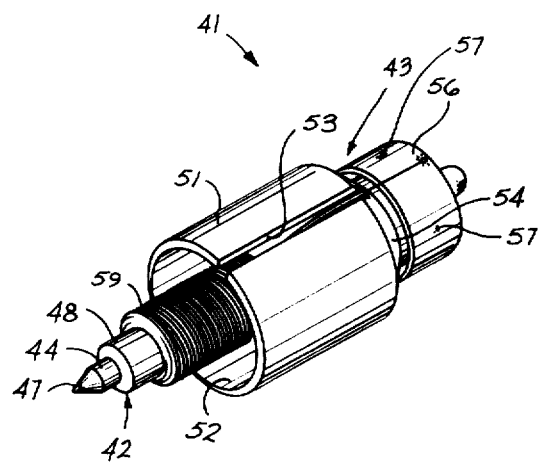

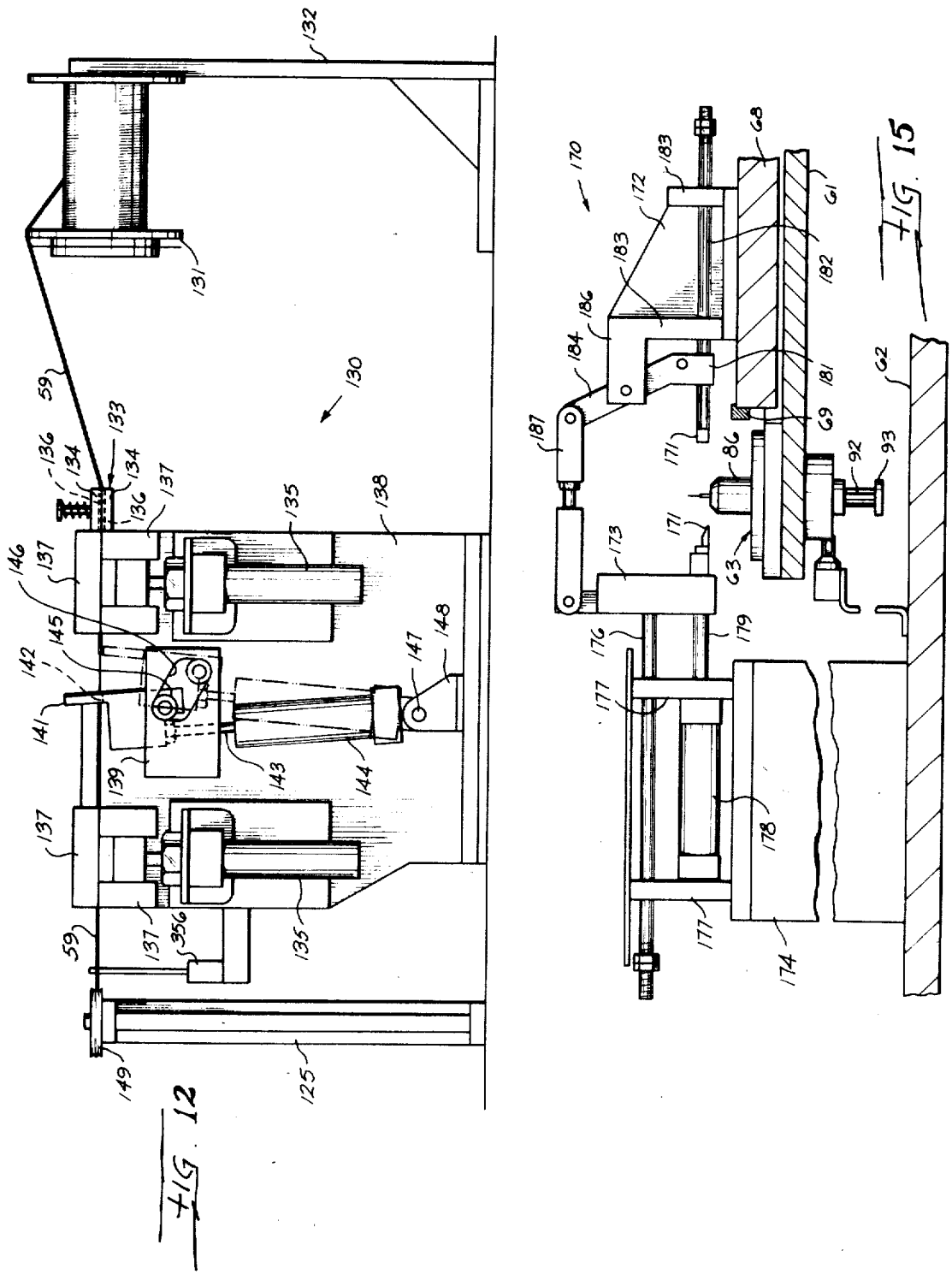

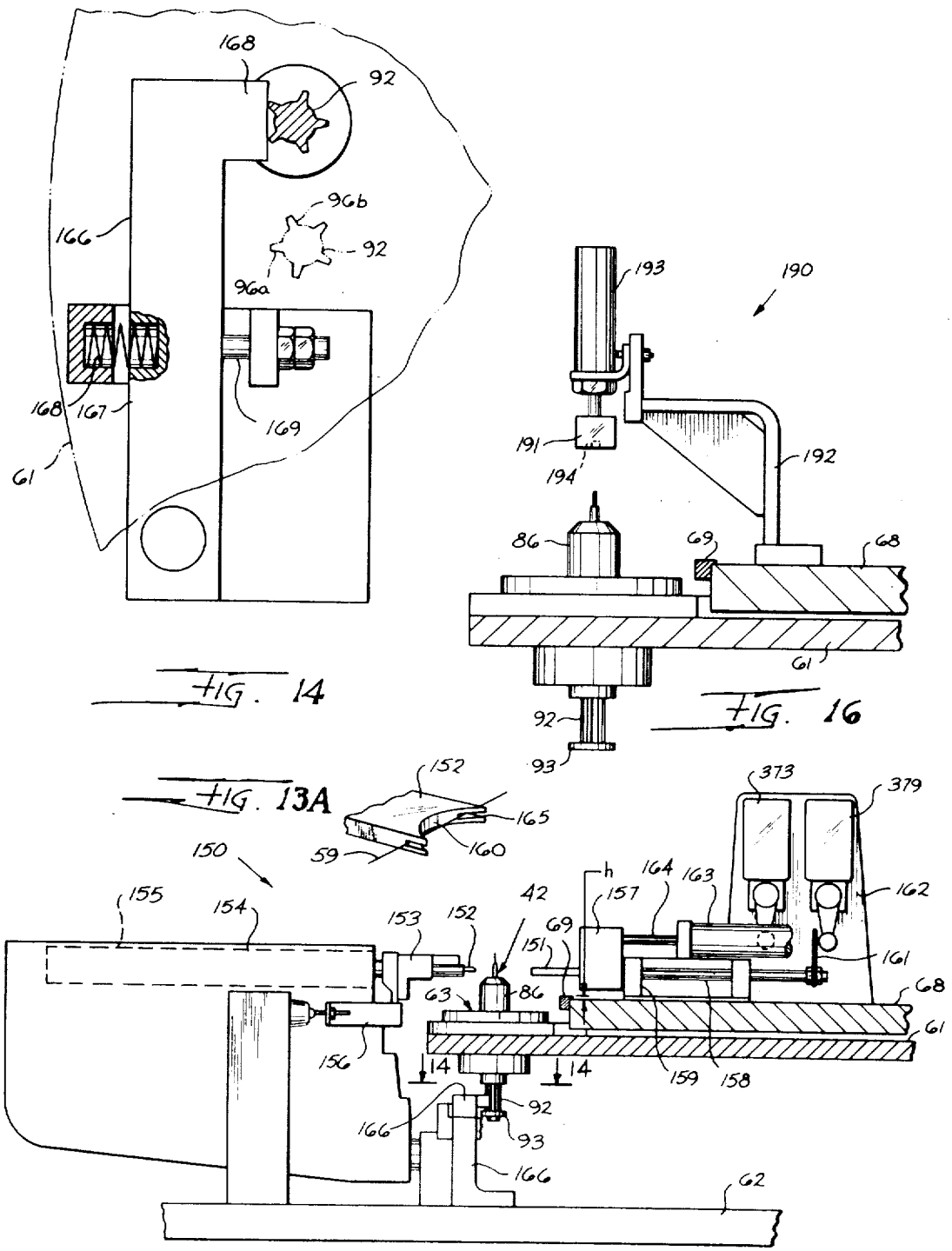

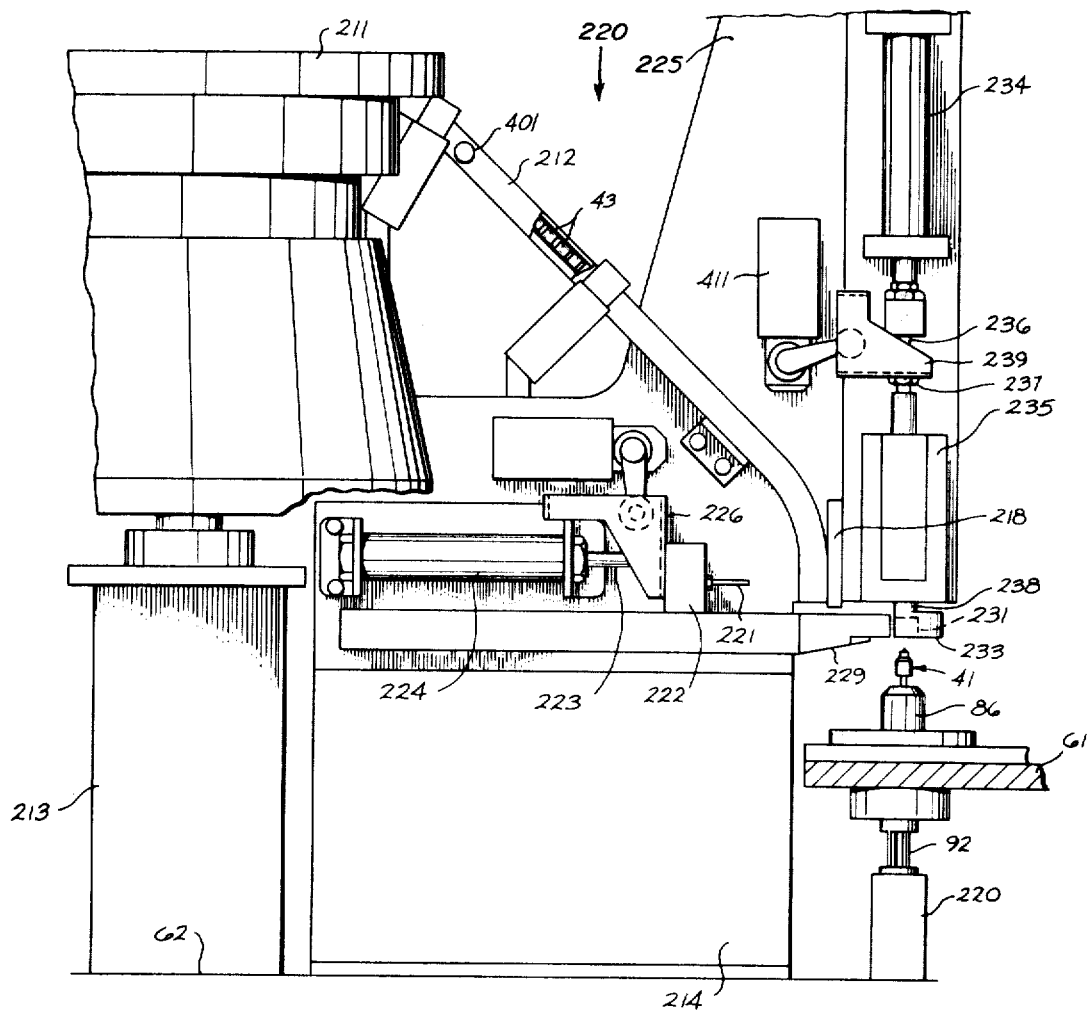
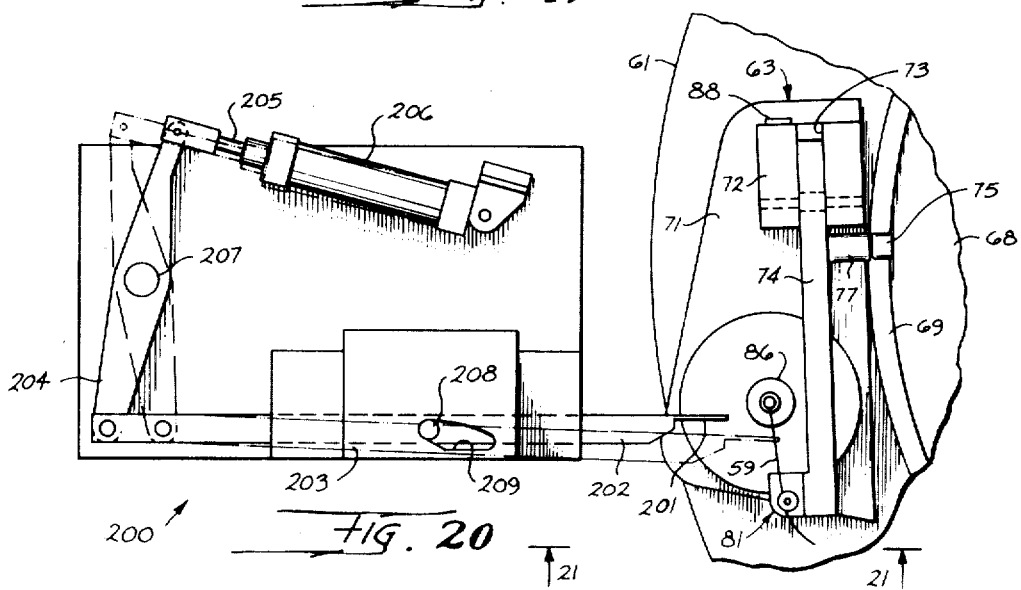

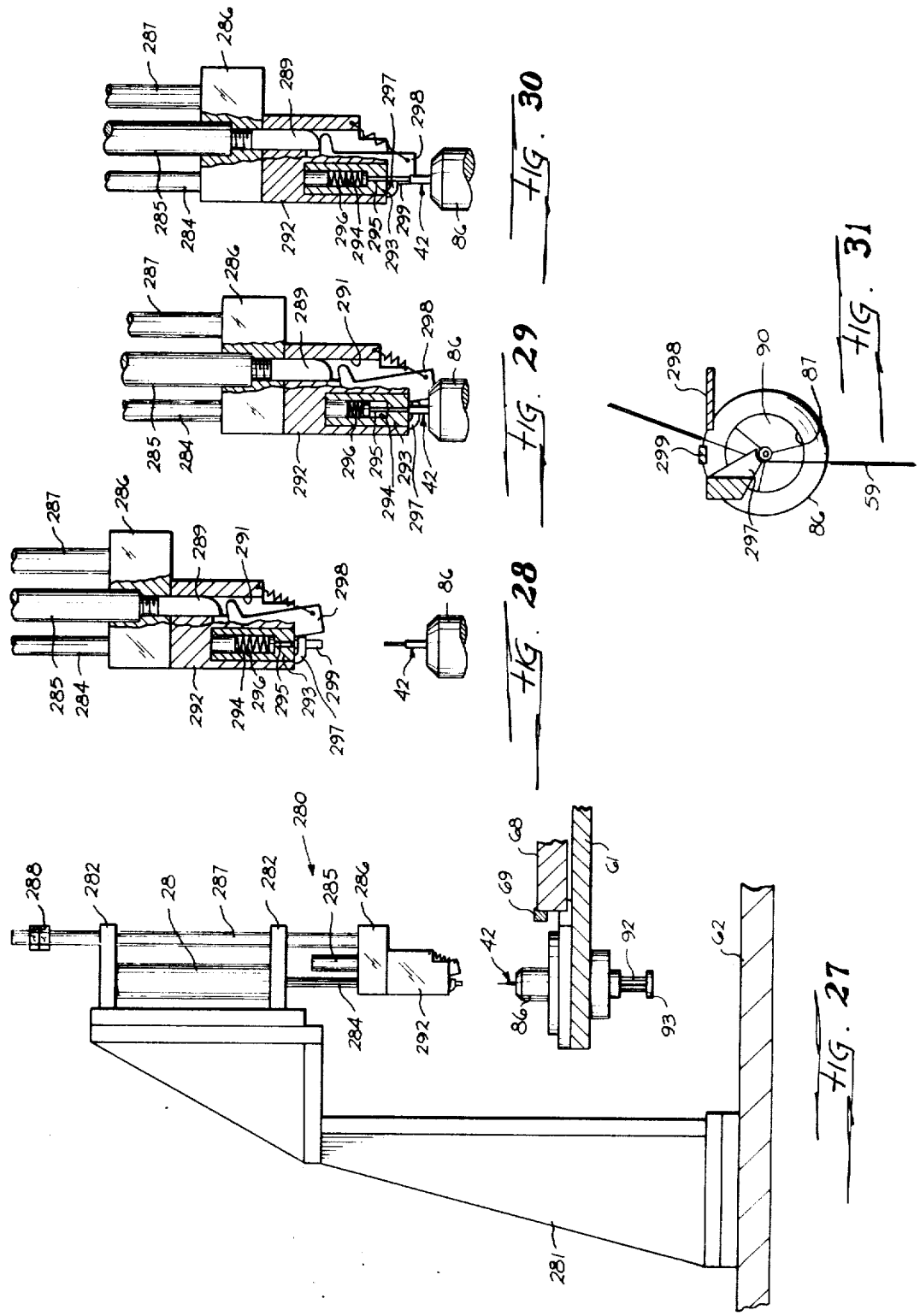

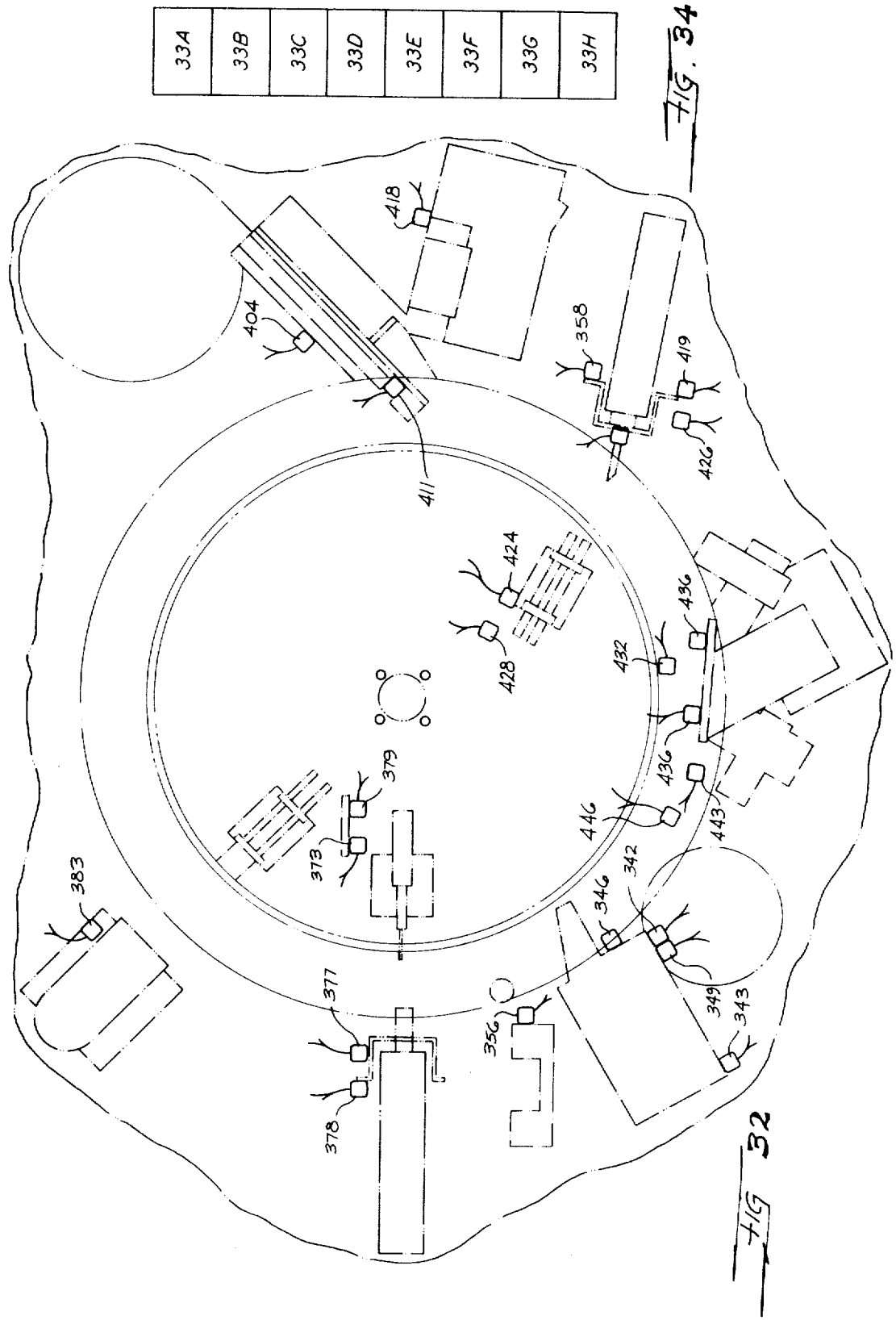

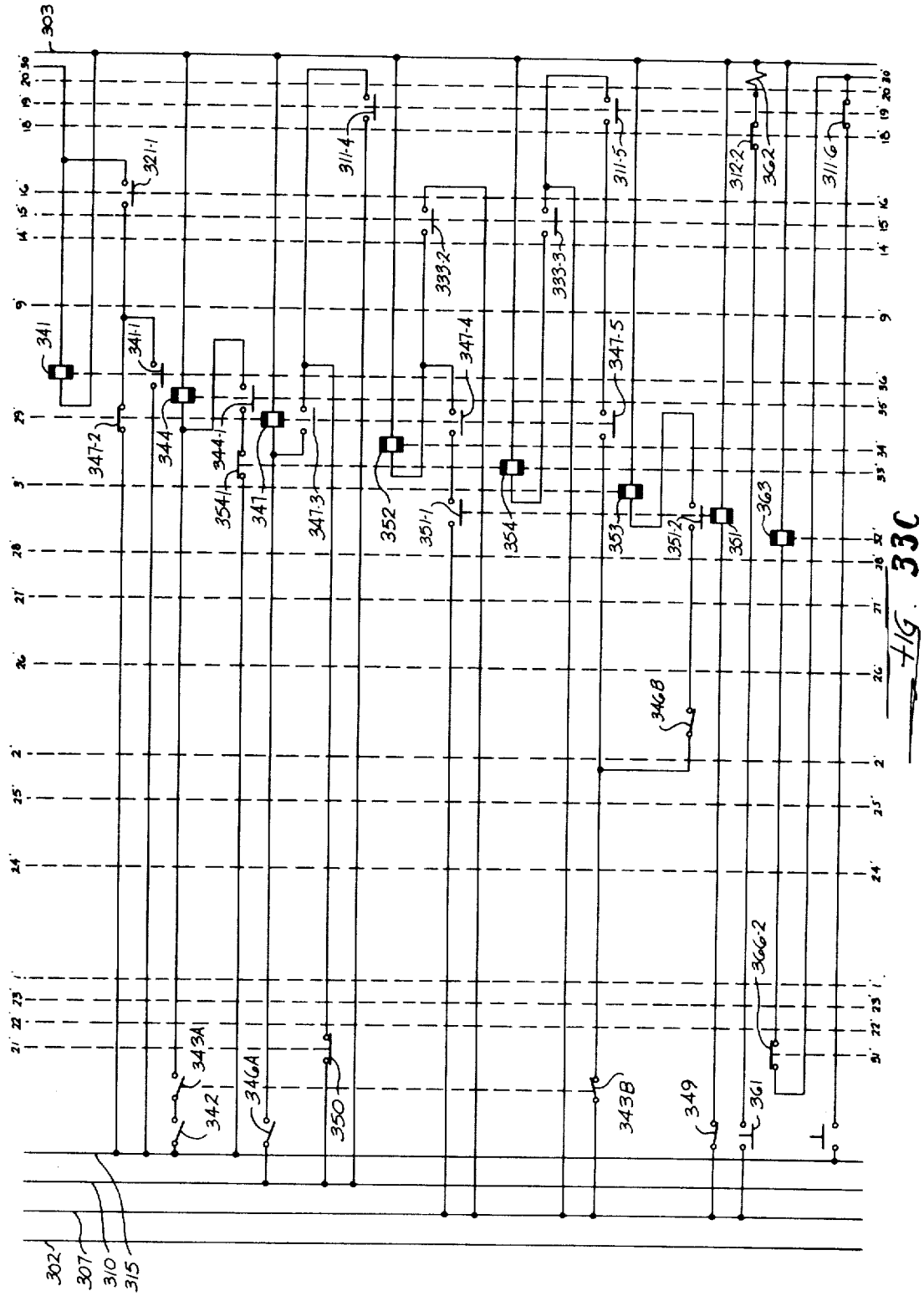

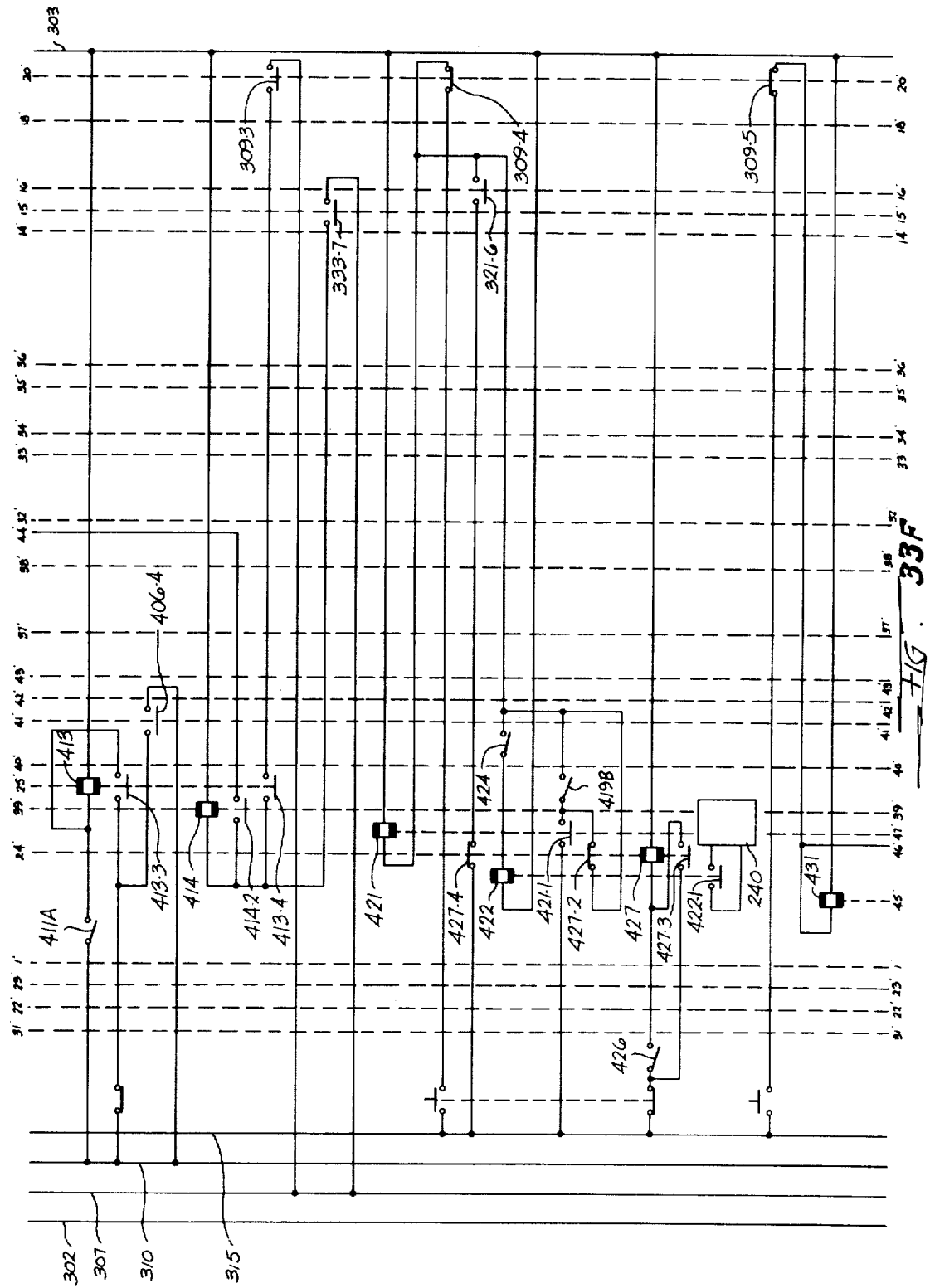

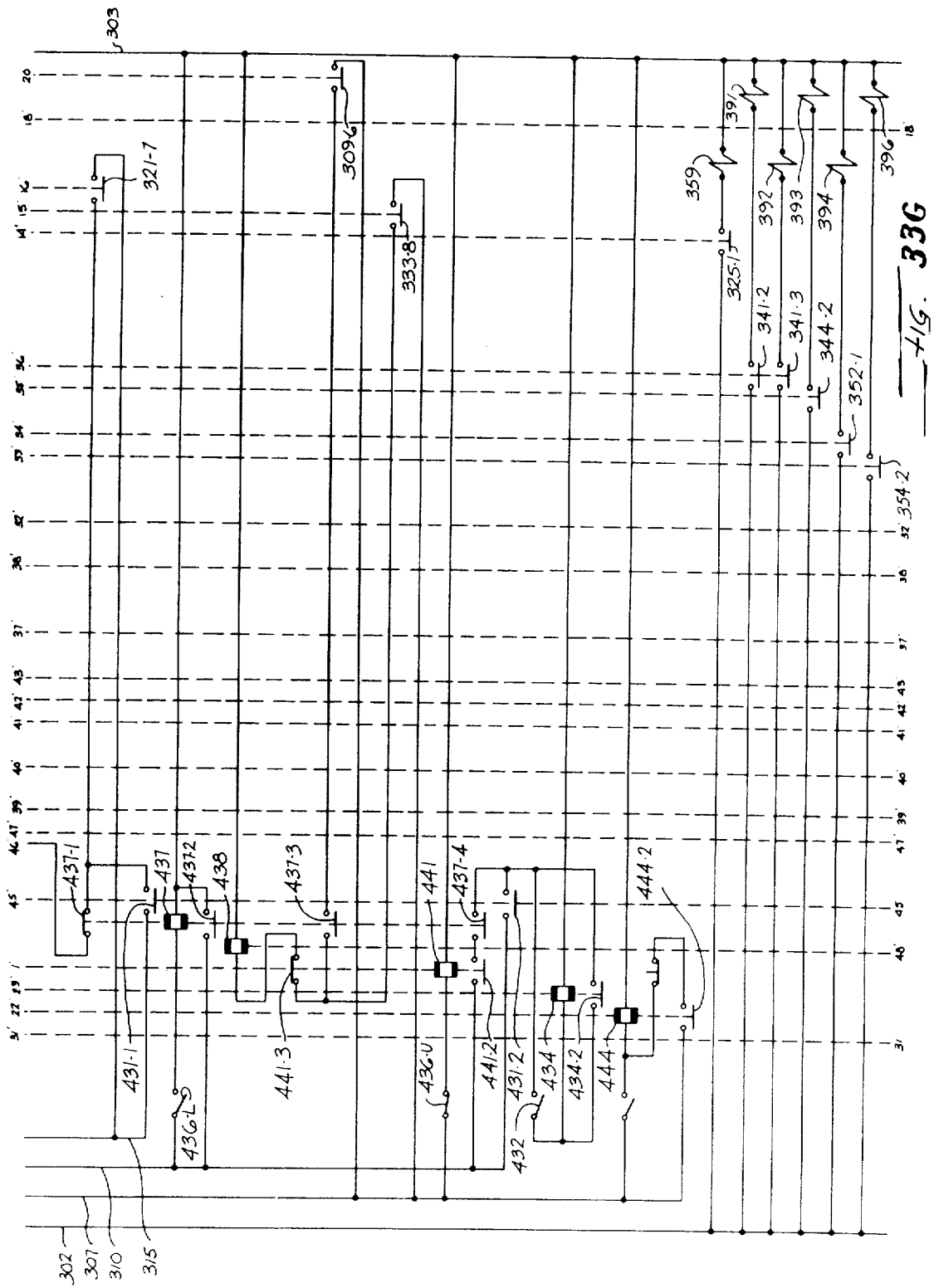

APPARATUS FOR ASSEMBLING ELECTRICAL COMPONENTS

CROSS REFERENCE TO RELATED APPLICATION

This is a division of application Ser. No. 878,017, filed Nov. 19, 1969, now U.S. Patent No. 3,618,204.

BACKGROUND OF THE INVENTION

1. Field of the Invention

This invention relates to apparatus for assembling electrical components and, more particularly, to apparatus for advancing successive ones of a mass of first parts on an indexable turntable through a plurality of work stations to fabricate the first part and for assembling successive ones of a mass of second parts to successive ones of the first parts and for connecting electrically each assembly of first and second parts to form an electrical component assembly.

2. Description of the Prior Art

In the manufacturing of electrical components, first parts and second parts must be fabricated and assembled together. For example, in the manufacture of heat coils which are used in central offices in incoming telephone lines to ground out overload currents before these currents damage the equipment in the central office, a bared leading end of an insulated filamentary wire must have a portion thereof welded to a sleeve of a pin and sleeve subassembly and then the wire must be wound around the pin and sleeve subassembly. The trailing end of the wire must be stripped of insulation and welded to a metal cap attached to a plastic shell which has been positioned over the pin and sleeve subassembly.

In the past, many of the operations related to the assembly of these heat coils have been accomplished by hand. Needless to say, this has been a time consuming and expensive task. Clearly, with the large quantities of heat coils which are required in building and maintaining telephone systems, more sophisticated methods and apparatus are in order for the mass production of heat coils.

To date, commercially available apparatus have been available which perform some of the steps required for the more efficient assembly of heat coils. Some of these apparatus include devices for feeding the pin and sleeve subassemblies successively and individually into workholders arranged about the periphery of an indexable turntable. The pin and sleeve subassemblies are fabricated in the workholders and, subsequently, individual ones of a mass of plastic shells having a metal cap secured to one end thereof are fed into engagement with and secured to individual ones of the pin and sleeve subassemblies. Moreover, these apparatus have also included devices for stripping initially a continuous insulated conductor wire from a supply thereof at spaced portions along the length thereof, the spaced portions coincide with the point of initial attachment of the wire to the sleeve of the pin and sleeve subassembly and to the point of subsequent attachment of the trailing end of the wire to the cap on the plastic shell. Facilities have also been provided for winding the wire on the pin and sleeve subassembly as the pin and sleeve subassemblies are advanced through the work stations spaced about the periphery of the turntable. Welding stations are provided in these apparatus for welding the leading and the trailing ends of each length of wire to the sleeve of the pin and sleeve subassembly and to the metal cap, respectively. However, no facilities were provided in these apparatus for strength testing the weld of the trailing end of the wire to the cap; nor were there facilities for testing electrically the heat coil assembly prior to ejecting the heat coil assembly from the apparatus.

SUMMARY OF THE INVENTION

It is an object of this invention to provide new and improved apparatus for assembling automatically electrical components.

It is another object of this invention to provide apparatus for assembling automatically successive ones of a plurality of first parts with successive ones of a plurality of second parts and for joining a wire to the first and second parts of each assembly thereof.

Still another object of this invention is to provide new and improved apparatus for testing the strength of a joint between a portion of a length of wire bonded to a part.

A yet still further object of this invention is to provide new and improved apparatus for positioning a wire extending from a supply in transverse engagement with a part to join the wire to the part and for forming the part to wind automatically the wire on the part.

An apparatus for automatically assembling successive ones of a mass of second parts to successive ones of a mass of first parts and for joining a wire to the first and second parts of each assembly of first and second parts, embodying certain principles of the present invention, may include a device for indexing a plurality of workholders to successive work stations. Facilities are provided at one work station for removing the insulation from a leading end and successive spaced portions of an insulated conductor wire extending from a supply of wire and for advancing the successive spaced portions adjacent to successive ones of the first parts. A bonding device is then actuated and advanced toward each successive one of the first parts to position the successive spaced portions of the wire in engagement with the successive ones of the first parts and to bond the successive spaced portions of the wire to the successive ones of the first parts. With the wire still extending from each succeeding one of the first parts to the supply, the workholders are indexed to another work station whereat a cutting device severs a length of the wire extending from successive ones of the first parts to the supply. A new leading end of the wire is attached to the first part in the next succeeding workholder. Facilities are provided for tensioning the lengths of wire extending from the successive ones of the first parts and for rotating the first part in the workholder to wind the wire on the first part while simultaneously distributing the wire. An assembly device feeds and assembles successive ones of second parts to successive ones of the first parts as a stripping device removes the insulation from the portion of the wire extending from and bonded to successive ones of the first parts. The workholder is advanced to a next work station and the distributor is actuated to urge the other portion of the wire against the second part. A joining device is provided for bonding the successive other portions of the wire to the successive ones of the second parts and for causing a testing device mounted on the bonding device to be moved into a path of travel transverse of the taut length of the wire. As the bonding device is moved out of engagement with the wire, the testing device engages the wire and exerts a pulling force on the wire to test the strength of the weld and break the bond at the joint. The successive ones of the assemblies of the first and second parts are then further tested and sorted.

BRIEF DESCRIPTION OF THE DRAWINGS

Other objects and features of the present invention will be more readily understood from the following detailed description of specific embodiments thereof when read in conjunction with the appended drawings, in which:

FIG. 1 is a perspective view of a heat coil showing a pin and sleeve subassembly which is assembled by the principles of this invention;

FIGS. 3 through 9 are a series of enlarged elevational views of the heat coil in various stages of assembly beginning with the pin and sleeve subassembly which is advanced through the work stations to have one end of a conductor wire welded thereto, then to have a shell and cap subassembly placed thereover and another end of the conductor wire welded to the cap of the shell and cap subassembly;

FIG. 12 is an enlarged sectional view of a conductor wire feeding station of the apparatus of FIG. 2 taken along line 12—12 thereof illustrating the conductor wire being payed out from a supply spool and advanced through a stripping device wherein predetermined portions of the conductor wire are bared of the insulation;

FIG. 13 is an enlarged sectional view of a welding device of the apparatus of FIG. 2 taken along line 13—thereof;

FIG. 13 A is an enlarged perspective view of a portion of a welding electrode of the welding device of FIG. 13;

FIG. 14 is an enlarged sectional view of the welding station of FIG. 13 taken along line 14—14 thereof which illustrates a pinion orienter located on the underside of the turntable at the welding station for orienting the pinion attached to a shaft extending from below the workholder and which engages subsequently a rack for turning the workholder and the pin and sleeve subassembly held therein to facilitate winding the wire on the sleeve of the pin and sleeve subassembly;

FIG. 15 is an enlarged sectional view of a cutting station of the apparatus of FIG. 2 taken along line 15—15 thereof which illustrates a device for severing the wire extending from the weld thereof to the sleeve of the pin and sleeve subassembly in a leading workholder to the supply spool and with a new leading end of the conductor wire being welded to the sleeve of the succeeding one of the pin and sleeve subassemblies;

FIG. 16 is an enlarged sectional view of a swaging station of the apparatus of FIG. 2 taken along line 16—16 thereof which illustrates a device for swaging the upper peripheral rim of the sleeve of each of the pin and sleeve subassemblies to slope the rim inwardly;

FIG. 19 is an enlarged sectional view of a shell subassembly feeding an assembly device at a combined shell assembly and stripping station of FIG. 2 taken along line 19—19 thereof which illustrates a device for feeding successive ones of a mass of shell and cap subassemblies into alignment with, and then assembling the shell and cap subassemblies to, successive ones of the pin and sleeve subassemblies;

FIG. 20 is an enlarged plan view of a stripping device at the shell assembly and stripping station shown in FIG. 19 and the apparatus shown in FIG. 2 whereat the insulation is stripped from a portion of the conductor wire extending from each of the pin and sleeve subassemblies;

FIG. 27 is an enlarged sectional view of a combined cutting and swaging station which may be used in place of the separate cutting and swaging stations shown in FIGS. 13 and 14;

FIGS. 28 through 30 are a series of enlarged elevational views and showing the combined cutting and swaging station at various stages in severing the wire and swaging the sleeve of the pin and sleeve subassembly;

FIG. 31 is an enlarged view showing the relative positions of the pin and sleeve subassembly, the conductor wire, a movable and a stationary cutting blade and a wire breaking member at the combined cutting and swaging station;

FIG. 32 is a plan view of the turntable and the platform shown in FIG. 2 and illustrating various limit switches which are positioned on the turntable and the platform for controlling automatically the operation of the assembly apparatus;

FIGS. 33A–3H, inclusive, together, constitute a simplified schematic diagram of an electrical circuit for controlling the operation of the apparatus of FIG. 2 in response to initiation by an operator and actuation of the limit switches shown in FIG. 32, and FIG. 34 is a diagram showing the manner in which FIGS. 33A–33H, inclusive are arranged.

DETAILED DESCRIPTION

Figure 2:
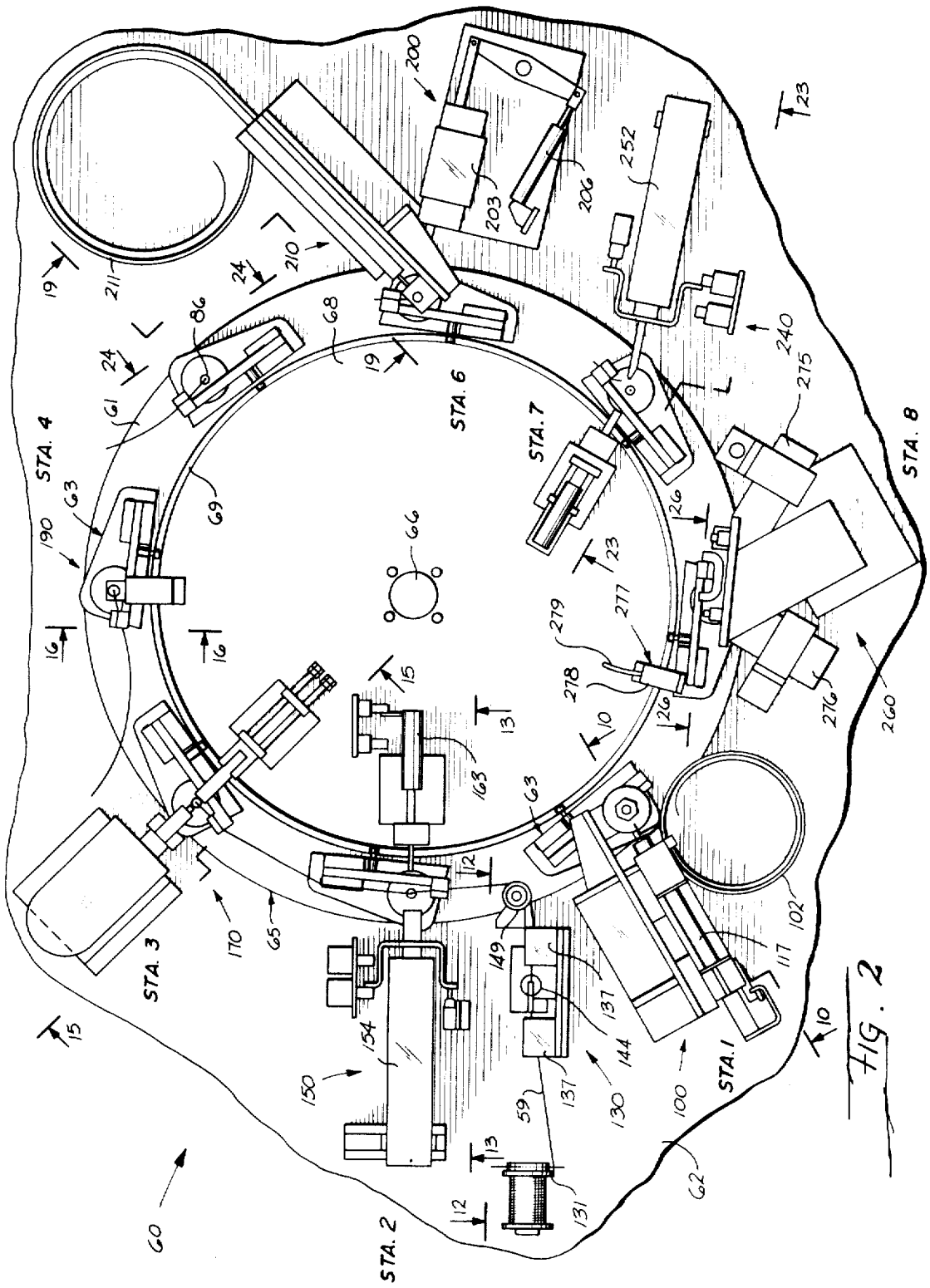
FIG. 2 is a plan view of an apparatus which embodies certain principles of this invention which includes a rotatably mounted circular turntable having a plurality of workholders arrayed about the circumferential edge thereof for advancing each of the workholders successively through each of a plurality of work stations for assembling a pin and sleeve subassembly with a shell and cap subassembly to assemble a heat coil.

Referring now to FIG. 1, there is shown a heat coil assembly, designated generally by the numeral 41, which is to be assembled by the apparatus of this invention. The heat coil assembly 41 includes a pin and sleeve subassembly 42 and a shell and cap subassembly 43. As can be seen in FIG. 3, the pin and sleeve subassembly 42 includes a pin 44 having a knurled end 46 and a pointed end 47. The pin 44 is soldered with a low melting temperature alloy, such as a bismuth mixture, in a sleeve 48 with the pointed end 47 protruding slightly from one end of the sleeve. The knurled and 46 extends some distance from the other end of the sleeve 48. Each of a mass of the pin and sleeve subassemblies 42—42 is assembled with one of a mass of the shell and cap subassemblies 43—43 so that the knurled end 46 is received in a recess in a closed end 49 (see FIG. 8) of a housing or shell 51.

The shell 51 is cylindrically shaped, having an open end 52 at one end thereof, and may be constructed of any suitable material, such as a plastic. The shell 51 is also formed with a slot 53 parallel with the longitudinal axis of the shell. The other closed end 49 of the plastic housing 51 has a beveled portion 54 which connects the cylindrical portion of the housing with the closed end. Moreover, a solder-plated brass cap 56 is received over the closed end 49 and is attached to the plastic shell 51 by protrusions 57 in the cap being received in indentations in the shell 51 (see FIG. 1).

Prior to the assembly of the pin and sleeve subassembly 42 with the shell and cap subassembly 43, one end of an insulated conductor wire 59 extending from a supply has the insulation removed therefrom and is welded to the sleeve 48 of the pin and sleeve subassembly (see FIG. 4). Then a portion of the wire 59 extending to the pin and sleeve subassembly 42 is severed (see FIG. 5) from the supply and the new leading end of the wire is attached to the pin and sleeve subassembly in the next succeeding workholder while maintaining the trailing part of the wire taut, and an upper rim of the sleeve 48 is swaged (see FIG. 6). The pin and sleeve subassembly and the workholder are rotated and in insulated portion of the conductor wire 59 is wound around the sleeve 48 (see FIG. 7). Subsequently, the insulation is removed from another portion of the length of wire and one of the pin and sleeve subassemblies 42—42 is assembled with the shell and cap subassembly 43 with the knurled end 46 received in the closed end 49 and with the other unwound part of the conductor wire extending through the slot 53 in the shell 51 (see FIG. 7). Then, the portion of the conductor wire 59 is welded to the cap 56 (see FIG. 8), after which the strength of the weld of the wire to the cap is tested. Then the heat coil assembly 41 is moved to a final station where an electrical characteristic of the heat coil assembly is determined and then the heat coil assembly is sorted in accordance with the test characteristic.

GENERAL OVER-ALL DESCRIPTION OF THE APPARATUS

An apparatus, designated generally by the numeral 60 (see FIG. 2), for carrying out the principles of this invention includes a turntable 61 which is mounted rotatably on a base 62 (see FIG. 10) nd which has a plurality of work stations arrayed about the periphery thereof. Moreover, the turntable 61 also has a plurality of workholders 63—63 attached to the turntable around the periphery thereof. At a first station (station No. 1, FIG. 2), a feeding device, designated generally by the numeral 100, (see FIG. 10), feeds successive ones of a mass of the pin and sleeve subassemblies 42—42 (see FIG. 3) into successive ones of the workholders 63—63. Then a leading one of the workholders 63—63 is moved with the turntable 61 to a second work station (station No. 2, FIG. 2) where a stripping blade 141 (see FIG. 12) strips a leading end of the insulated wire 59 and a welding device 150 (see FIG. 13) welds the bared leading end to the sleeve 48 (see FIG. 4) of the pin and sleeve subassembly 42. The conductor wire 59 may, for example, have a copper-nickel-zinc composition. As the turntable 61 is moved rotatably into a third work station (station No. 3, FIG. 2), the wire 59 extends from the pin and sleeve subassembly 42 to a supply 64 of the wire. At the third work station a cutting device, designated generally by the numeral 160, (see FIG. 15), severs a length of the wire 59 extending to the pin and sleeve subassembly 42 (see FIG. 5) in the workholder 63 from the supply 64 with the new leading end of the wire 59 attached to the sleeve 48 of the pin and sleeve subassembly 42 in the next succeeding workholder 63. The workholder 63 is advanced to a fourth work station (station No. 4, FIG. 2) where a swaging device, designated generally by the numeral 190 (see FIG. 16), turns an upper rim of the sleeve 48 inwardly (see FIG. 6). After the rim of the sleeve 48 has been swaged, the workholder is indexed through a fifth work station and the pin and sleeve subassembly 42 is rotated to wind the length of wire 59 on the sleeve 48 (see FIG. 7) while tensioning the length of wire extending from and secured to the pin and sleeve subassembly 42. As the wire 59 is wound on the sleeve 48, the workholder 63 is advanced with the turntable 61 to the sixth work station (station No. 6, FIG. 2) where a stripping device 200 (see FIG. 20) removes the insulation from a portion of the wire extending from the pin and sleeve subassembly 42, (see FIG. 7), and where a feeding device, designated generally by the numeral 210 (see FIG. 19), places a plastic shell 51 over the knurled end 46 of the pin and sleeve subassembly 42 (see FIG. 8). Then the heat coil assembly 41 is moved to a seventh work station (station No. 7, FIG. 2) whereat a welding device, designated generally by the numeral 240, (see FIG. 23), welds the portion of the wire 59 to the cap 56 (see FIG. 9) whereafter the strength of the weld to the cap is tested. Finally, the turntable 61 is indexed to position the heat coil assembly 41 at a final work station (station No. 8, FIG. 2) where a testing and sorting device, designated generally by the numeral 260, determines an electrical test characteristic of the heat coil assembly, after which the heat coil assembly is ejected therefrom and sorted in accordance with the test characteristic.

CONVEYOR

Referring now to FIG. 2, there is shown a conveyor, designated generally by the numeral 65, which includes the turntable 61. The turntable 61 is secured to a shaft 66 and is moved rotatably with the shaft intermittently and successively in a clockwise direction, as viewed in FIG. 2, to index the turntable through each of a plurality of work stations by a continuously operated drive motor 67 (see FIG. 33). The turntable 61 is mounted on the shaft 66 so that the turntable is spaced from the base 62 (see FIG. 10). Moreover, a stationary, circular top worktool platform 68 is mounted on the base 62 and is concentric with the turntable 61 (see also FIG. 13). However, the circular top platform 68 has a diameter somewhat smaller than the diameter of the turntable 61. In this way, a plurality of the workholders 63—63 may be mounted on and individually attached to the turntable 61 and arrayed about the periphery thereof. Then, at each of the plurality of work stations, a plurality of work devices which are used to assemble the heat coil assemblies 41—41 may be attached to the circular top platform 68 and to the base plate 62, and may cooperate to perform work functions on the workpieces in the workholders which are positioned on the turntable 61 in the space therebetween.

The top of the platform 68 has an annular cam surface 69 (see FIGS. 2 and 13) concentric with the platform and adjacent the peripheral edge of the platform. The annular cam surface 69 has a height ($h$) (see FIG. 13) which varies along the circumference thereof to present a contoured or cam surface which is used in the winding operation of the wire 59 to distribute the wire on the pin and sleeve subassembly 42 and which will be hereinafter described in detail.

Figure 17:
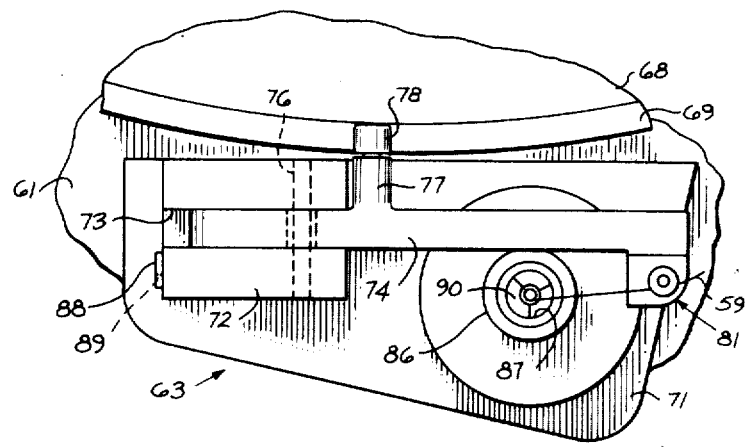
FIG. 17 is an enlarged plan view of one of the workholders which is arrayed about the circumferential peripheral edge of the turntable and having a pivotally mounted arm for distributing the wire around the sleeve of a pin and sleeve subassembly as the arm is moved pivotally by a cam follower which rides on a contoured cam surface on a platform.

Referring now to FIGS. 2 and 17, it can be seen that each of the workholders 63-63 includes a base plate 71 having a block 72 attached thereto at one end. The block 72 has a longitudinal channel 73 formed therethrough for receiving one end of a distributor arm 74. The distributor arm 74 is pivotally mounted at one end thereof to the block 72 by a pin 76 with the other end of the distributor arm extending from the channel 73 in a direction opposite to the clockwise rotary movement of the turntable 61.

The distributor arm 74 is assembled with a protruding portion 77 which extends radially inwardly from the distributor arm toward the top circular platform 68. A cam follower 78 is mounted rotatably on the protruding portion 77 and engages the annular cam surface 69 of the top circular platform 68. In this way, the cam follower 78 supports the unpinned other end of the distributor arm 74 and, as the turntable 61 is moved rotatably about the stationary platform 68, the cam follower rides on the cam surface 69 to move pivotally the distributor arm 74 in accordance with the configuration of the cam surface.

Moreover, the unpinned other end of the distributor arm 76 is equipped with a tensioning device 81 (see FIG. 24) for receiving and tensioning the wire 59. The tensioning device 81 includes a stud 81 having a threading groove in which the wire 59 is received with the stud 82 positioned between the distributor arm 74 and an overlying bracket 83. A spring mounted screw 84 extends through the bracket 83 and the stud 82 and into the distributor arm 74 in order to mount the stud and to adjust the compressive force between the stud 82 and a boss 85 of the distributor arm. The tightening of the screw 84 increases the clamping effect of the stud 82 on the wire 59 in the groove to tension the wire.

Each of the workholders 63-63 includes a guide 88 having a V-shaped opening 89 and mounted on a leading end of the block 72 (see FIG. 17). As can best be seen in FIG. 2, the stud 82, a chuck 86 and the guide 88 are arranged on the workholder 63 so that the length of the wire 59 strung between the V-shaped opening 89 and engaging the stud 82 is substantially linear and engages the top portion of the circumferential surface of the sleeve 48 of the pin and sleeve subassembly 42 held in the chuck 86 (see also FIG. 4).

In order to hold one of the pin and sleeve subassemblies 42–42, the chuck 85 having a housing 78 is positioned on the base plate 71 of the workholder 63 between the threading device 81 of the distributor arm 74 and the block 72. The chuck 86 has an opening formed between a plurality of jaws 90—90 (see FIG. 31) for receiving the pointed end 47 of the pin 44 and for holding the pin in an upright position with the knurled end 46 extending upwardly. The jaws 90-90 are attached to a shaft 91 which extends downwardly through an opening in the turntable 61 and which is spring biased in an upward direction. In this way, the jaws 90-90 are normally biased upwardly to cam against the wall of the opening in the housing 87 of the chuck 86 to maintain the jaws in a closed position. As the shaft 91 is moved downwardly, the jaws 90—90 are drawn downwardly and are cammed against the wall of the housing 87 to open the jaws to permit insertion of a pin and sleeve subassembly 42.

The chuck 86 of the workholder 63 is also secured to the shaft 91 (see FIGS. 10 and 29) which is mounted rotatably through the base plate 71 and the turntable 61 in order to move rotatably the pin and sleeve subassembly 42 held on the chuck to wind the wire 59 on the sleeve 48. The shaft 91 has a pinion 92 formed on the lower end thereof and has a collar 93 attached thereto just below the lower end of the pinion 92. The pinion 92 is designed to mesh with a rack 94 (see FIG. 18) mounted to the base 62 of the apparatus 60. As the turntable 61 is indexed, the pinion 92 engages with the rack 94 to turn the shaft 91 and rotate the chuck 86 and the pin and sleeve subassembly 42 which is held between the jaws 90—90 of the chuck. In order to distribute the wire 59 vertically around the sleeve 48, the cam follower 78 of the distributor arm 74 rides on the contour of the annular cam surface 69 (see FIG. 17) to move pivotally the distributor arm about the pin 76 to distribute the wire on the pin and sleeve subassembly 42 which is rotated with the chuck 86 by the cooperation between the pinion 92 and the rack 94.

PIN AND SLEEVE SUBASSEMBLY FEEDING STATION

Figure 11:
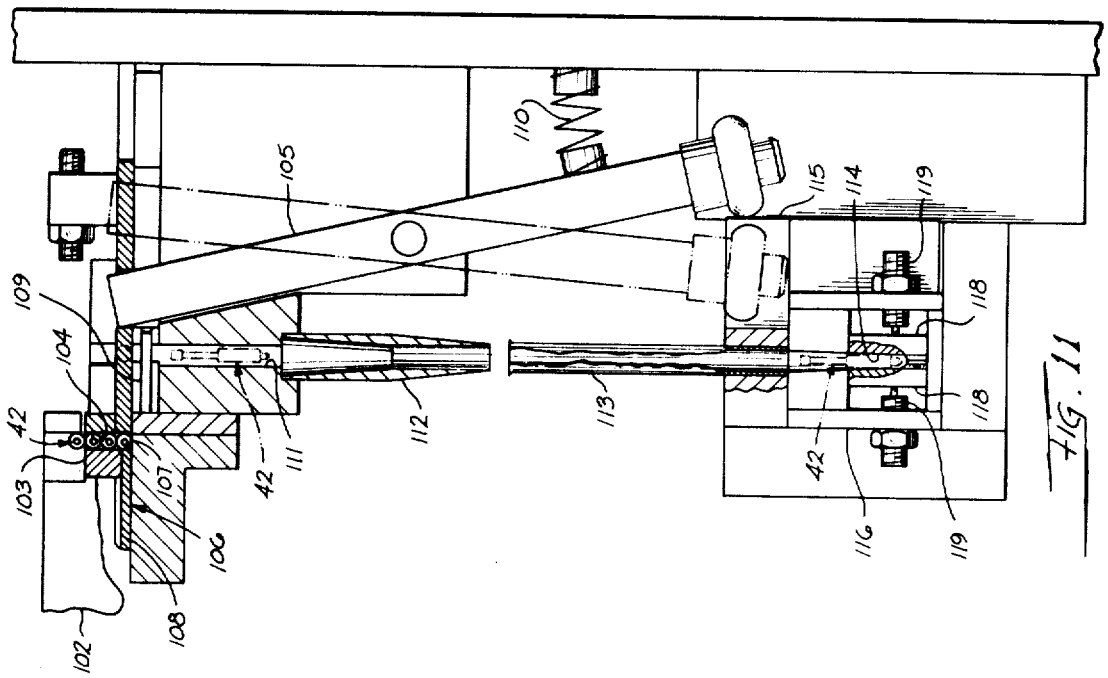
FIG. 11 is an enlarged detailed view of the pin and sleeve subassembly feed device of FIG. 10 showing the movement of successive pin and sleeve subassemblies from a vibratory bowl feeder to a placement slide for pushing the pin and sleeve subassemblies over the workholder in registration with that station.
Figure 10:
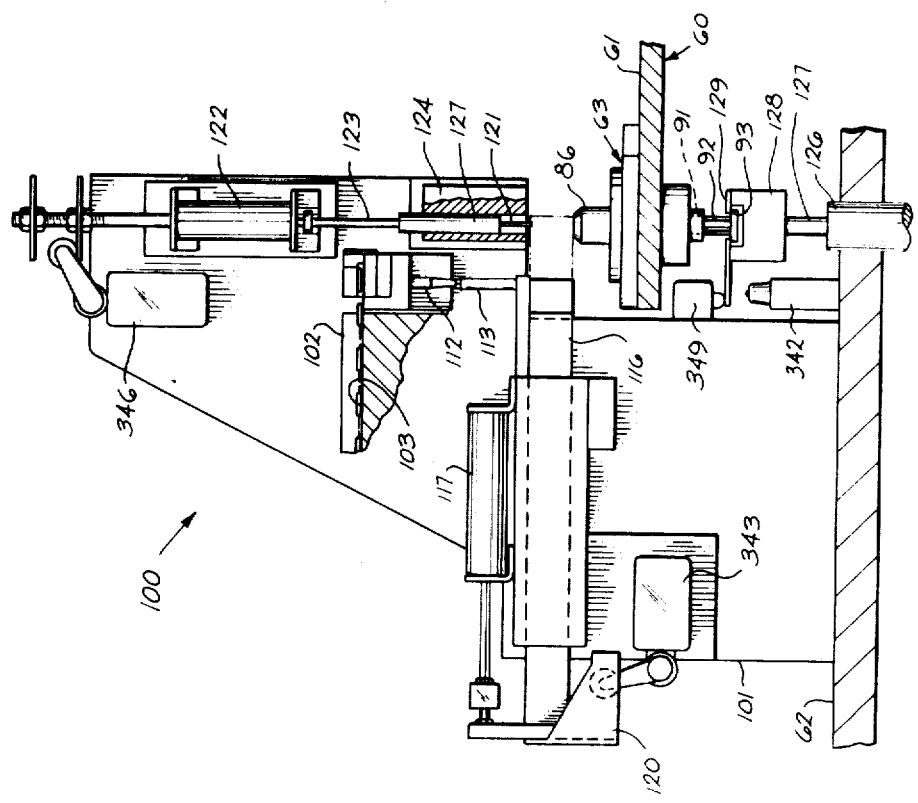
FIG. 10 is an enlarged sectional view of a pin and sleeve subassembly feed device of the apparatus of FIG. 2 taken along line 10—10 thereof with portions broken away for purposes of clarity.

Referring now to FIGS. 2, 10 and 11, there is shown the pin and sleeve subassembly feeding device 100 for feeding successive ones of a mass of the pin and sleeve subassemblies 42—42 into successive ones of the chucks 86—86 of the workholders 63—63 which are spaced around the periphery of the turntable 61. The pin and sleeve subassembly feeding device 100 includes a frame 101 which is mounted on the base 62 of the apparatus 60 and also includes any commercially available vibratory bowl feeder 102 which may be adapted for use in the apparatus 60. The vibratory bowl feeder 102 is operated to move the pin and sleeve subassemblies 42—42 from within the bowl along a ledge 103 and to advance the pin and sleeve subassemblies to a feed opening 104 formed in the ledge. As can be seen in FIG. 11, the feed opening 104 is adapted to receive a plurality of the pin and sleeve subassemblies 42—42.

The opening 104 overlies a reciprocally movable slide 106 which is moved radially outward from the turntable 61 toward the bowl feeder 102 so that a receiving slot 107 in the slide receives the leading one of the pin and sleeve subassemblies 42—42 which has been advanced along the ledge 103 and into the opening by the vibratory forces imparted the bowl feeder. Then, the slide 106 is moved radially inwardly of the turntable 61 away from the bowl feeder 102 so that a solid portion 108 of the slide now underlies the opening 104 and supports the remaining pin and sleeve subassemblies 42—42 in the opening. Moreover, the slide 106 is separated physically from the bowl feeder 102 so that the vibrations of the bowl feeder are not imparted to the slide, which vibrations may unduly effect the operation of the slide in feeding the pin and sleeve subassemblies 42—42 to the workholder 63. After the slide 106 has received a leading one of the pin and sleeve subassemblies 42—42 in the receiving slot 107 and is moved away from the bowl feeder 102, the receiving slot is positioned over a pin 109 (see FIG. 11).

The pin 109 is used to orient the pin and sleeve subassemblies 42—42 for subsequent movement into one of the chucks 86—86 on one of the workholders 63—63 in registration with the feeding device 100. The pin 109 is mounted transversely of the receiving slot 107 so that as each of the pin and sleeve subassemblies 42—42 is advanced by the slide 106 away from the opening 104, the pin and sleeve subassemblies are moved individually over and spaced above the pin, whereupon the pin and sleeve subassemblies drop vertically by gravity and come to rest on the pin.

The pin 109 is positioned beneath the right hand location of the receiving slot 107, as viewed in FIG. 11, so that regardless of the longitudinal orientation of the pin and sleeve subassembly 42 within the receiving slot, the pin and sleeve subassembly pivots about the pin so that the pointed end 47 of the pin 44 is always oriented downwardly. Because of the construction of the pin and sleeve subassembly 42, the center of gravity is somewhere within the sleeve section 48. If the pin and sleeve subassembly 42 is fed with the pointed end 47 forward (as related to line of advancement along the ledge 103 of the bowl feeder 102), the pin and sleeve subassembly comes to rest on the pin 109 so that the heavier sleeve 48 drops vertically downward first through a passage 111 and then into and through a chute 112, into a funnel 113 and into a nest 114 formed in a second slide 116 (see FIGS. 10 and 11).

The second side 116 is reciprocally movable by an air cylinder 117 (see FIG. 10) so that as each of the successive ones of the pin and sleeve subassemblies 42—42 is received in the nest 114 in the second slide, the slide is moved by the air cylinder radially inward toward the turntable 61 to position successively each of the pin and sleeve subassemblies over one of the chucks 86-86 of the workholders 63—63 currently in position under the feeding device 100. Moreover, the nest 114 in the slide 116 is formed between a pair of opposed resilient fingers 118—118 (see FIG. 11) which are biased inwardly toward each other by a pair of opposed adjustably settable lugs 119 to clamp one of the pin and sleeve subassemblies 42—42 therebetween.

As can best be seen in FIGS. 10 and 11, the slide 116 is formed with one end having tapered camming surfaces 115—115 which are used to control the escapement of the pin and sleeve subassemblies 42—42 from the slide 106 into the opening 111. Normally, the slide 106 is biased to the right, as viewed in FIG. 11, by a pivotally mounted rod 105 which has one end protruding into an opening in the slide and which has the other end urged in a clockwise direction, as viewed in FIG. 11, and into engagement with one of the camming surfaces 115-115 by a compression spring 110. When the slide 116 is moved to position the pin and sleeve subassembly 42 held in the nest 114 thereof over one of the chucks 86—86, one of the camming surfaces 115-115 is cammed against the lower follower end of the rod 105 to move pivotally the rod in a counterclockwise direction, as viewed in FIG. 11, to move the slide 106 to the left to align the receiving slot 107 with the opening 104. The alignment of the receiving slot 107 with the opening 104 permits the lowermost one of the pin and sleeve subassemblies 42—42 to drop into the receiving slot with the remaining pin and sleeve subassemblies supported on the pin and sleeve subassembly in the receiving slot. Then, when the slide 116 is moved retractably away from the chuck 86, the follower end of the rod 105 rides along one of the tapered camming surfaces 115—115 to permit the spring 110 to urge the rod in a clockwise direction. As the rod 105 is moved in a clockwise direction, the slide 106 is advanced to the right, as viewed in FIG. 11, to align the receiving slot 107 with the opening 111 and to allow the pin and sleeve subassembly to drop downwardly into engagement with the pin 109 and then into the chute 112.

As the slide 116 is moved over the chuck 86 of the workholder 71, currently positioned in registration with the feeding device 100, an air operated plunger 121 is moved downwardly by an air cylinder 122, acting through a rod 123 slidably secured in a sleeve 124. The plunger 121 imparts a pushing force to the pin and sleeve subassembly 42 and thereupon moves the fingers 118—118 away from one another as the plunger continues to move downwardly and push the pin and sleeve subassembly through the nest 114 in the slide 116 and into the chuck 86 with the knurled end 46 of the pin 44 oriented upwardly (see FIG. 3). Simultaneously therewith, an air cylinder 126 is actuated to move a piston rod 127 and a block 128 downwardly, as viewed in FIG. 10, to impart a pulling force through a plate 129 against the collar 93 to move the shaft 91 downwardly. As the shaft 91 is moved downwardly, the jaws 90—90 in the chuck 86 are opened to permit the pin and sleeve subassembly 42 to be received in the opening therebetween.

WIRE FEEDING AND WELDING STATION

The pin and sleeve subassembly 42 in a leading one of the workholders 63—63 is indexed into a second work station of the apparatus 60 whereat a wire feeding and a welding device, designated generally by the numerals 130 and 150, respectively, (see FIG. 2), removes the insulation from a leading end of an insulated wire 59 and then welds the leading bared end to a top circumferential portion of the sleeve 48 of the pin and sleeve subassembly.

Referring now to FIG. 12, there is shown the wire feeding and stripping device 130 at the second work station which includes a spool 131 of the fine gauge, e.g., 0.007 inch insulated wire 59. The spool 131 of wire 59 is mounted for rotation on a stanchion 132 and is payed out so that the convolutions of wire are moved over one of the flanges of the spool. The insulated wire 59 is advanced through a spring-loaded guide block 133 having a pair of plates 134—134, each of which has a groove 136 formed therebetween for receiving the wire. The wire 59 is then advanced under a pair of spaced hold-down bars 137—137. The hold down bars 137—137 are attached to and extend from a vertical plate 138 which is mounted on the base plate 62 of the apparatus 60.

Figure 21:
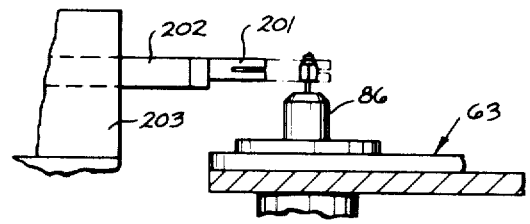
FIG. 21 is a detailed elevational view of the stripping device of FIG. 20 taken along line 21—21 thereof which illustrates in broken lines the actuated position of a stripping blade to engage with the insulation of a portion of the length of wire extending from the pin and sleeve subassembly in a chuck of the workholder.

In order to strip spaced portions of the continuous insulated wire 59 for subsequent welding of the wire to the sleeve 48 of each of the pin and sleeve subassemblies 42—42, a stripping blade 141 is provided. The stripping blade 141 has a tapered edge with a U-shaped groove 142 formed therein (see an identical blade 201, (FIG. 21) to facilitate the reception of the wire 59. Moreover, the blade 141 is mounted on a rod 143 which extends from a cylinder 144. The rod 143 has a cam follower 145 extending externally therefrom for following a cam opening 146 in a plate 139 attached to the vertical plate 138. The cylinder 144 has one end thereof pivotally mounted on a pin 147 supported in a bearing 148. In this way, the stripping blade 141 is mounted for vertical movement as well as for horizontal movement.

As the wire 59 is advanced under the hold-down bars 137—137, the stripping blade 141 is actuated to move the blade upwardly and into engagement with the insulated wire in the groove 136. Then, the stripping blade 141 is moved in the direction of advancement of the wire 59 to strip a predetermined portion L (see FIGS. 4 and 12) from the wire. The wire 59 is then advanced continuously around a guide sheave 149 which is rotatably mounted on a mounting bracket 135 attached to the base 62 of the apparatus 60. The sheave 149 is positioned so that the wire 59 is pulled over the sheave and then through the groove between the stud 82 and the distributor arm 74 (see FIG. 2) and then through the guide 88.

The predetermined length of bared wire L is spaced along the continuous length of the wire 59 so that, as each of the chucks 86 on the workholders 63—63 is advanced into registration with the welding device 150, one of the predetermined lengths L of bared wire is in engagement with the top portion of the sleeve 48 of the pin and sleeve subassembly 42 held in the workholder 63 currently in registration with the welding device (see FIG. 4).

The welding device 150 is disposed in a clockwise direction from the guide sheave 149, as viewed in FIG. 1, and includes an anvil electrode 151 and a welding electrode 152 which are spaced apart and which are movable into engagement with the pin and sleeve subassembly 42 and with the bared exposed portion L of the wire 59. As the electrodes 151 and 152 engage the sleeve 48 and press the bared portion L of the wire 59 against the sleeve 48, the welding device is operated to secure the bared portion to the sleeve 48.

As can best be seen in FIGS. 2 and 13, the welding electrode 152 is mounted on a carriage 153 which is slidably mounted in a housing 154 on the base 2. The carriage 153 is moved slidably inward toward the turntable 61 by an air cylinder 155 to engage the welding electrode 152 with the bared length L of the wire 59. The carriage 153 also has a bracket 156 extending rearwardly therefrom along a radial line from the center of the turntable 61 for actuating a limit switch 377 and a limit switch 378 which are used in controlling the operation of the apparatus 60.

The welding electrode 152 is formed to facilitate engaging the wire 59 between the welding electrode and the sleeve and to align vertically the wire on the sleeve 48. In order to accomplish these functions, the welding electrode 152 has a thickness, measured along a vertical axis, as viewed in FIG. 13, slightly less than twice the thickness of the wire 59. Moreover, the end of the welding electrode is formed with a concave surface 160 for receiving the sleeve 48 of the pin and sleeve subassembly 42. The concave surface 160 has a pair of aligned slots 165—165 extending transversely of the concave surface thereof. As the welding electrode 152 is moved radially inward of the turntable 61, the wire 59 is received in the spaced slots 165—165 and moved into engagement with the sleeve 48 and the concave surface 160.

Referring again to FIG. 13, it can be seen that the anvil electrode 151 is attached to a carriage 157 having a rod 158 which is mounted slidably in a pair of spaced bearings 159—159 that are supported on the platform 68. One end of the rod 158 has a vertically upstanding actuator plate 161 for actuating either of a pair of spaced limit switches 373 and 379 (see also FIG. 32) for controlling the operation of the apparatus 60. The limit switches 373 and 379 are attached to a mounting plate 162 which is secured to the platform 68. In order to move the anvil electrode 151 radially of the turntable 61 and slidably into engagement with the sleeve 48 of the pin and sleeve subassembly 42 in registration with the welding device 150, an air cylinder 163 has a piston rod 164 attached to the carriage 157.

Moreover, the second work station which includes the wire feeding and stripping device 130 and the welding device 150 also includes a pinion orienter 166, (see FIG. 14). The pinion orienter 166 is mounted on the base plate 62 of the apparatus 60 in alignment with the welding device 150. It has been noted hereinbefore that each of the chucks 86—86 has a shaft 91 depending downwardly therefrom with a pinion 92 and a collar 93 secured to a lower end thereof. In order for the gear teeth 96—96 of the pinion 92 to engage correctly with the rack 94 at a subsequent station in order to rotate the chuck 86 and the pin and sleeve subassembly 42 held therein, it is necessary that the shaft 91 be oriented so that a leading one 96 of the gear teeth 96—96 of the pinion will correctly engage the rack teeth of the rack 94. Should the pinion 92 be oriented incorrectly, the gear teeth 96—96 may jam against the rack 94 as the turntable 61 is indexed to engage the pinion with the rack.

As can best be seen in FIG. 14, the pinion orienter 166 includes a pivotally mounted lever arm 167 having a bossed end 168. Moreover, the lever arm 167 is normally biased in a clockwise direction, as viewed in FIG. 14, by a spring 168 into engagement with an adjustably settable stud bolt 169. As the turntable 61 is moved indexably to position one of the workholders 63—63 in registration with the welding device 150 then, should the pinion 92 associated with that particular workholder 63 be oriented properly, the gear teeth 96—96 on the pinion 92 are spaced and simply moved slidably along the surface of the bossed end 168 (see FIG. 14). However, should one of the teeth 96-96 of the pinion 92, which is farthest from the center of the turntable 61, be oriented in a direction along the radius of the turntable (see tooth 96a of the pinion 92 shown in broken lines, FIG. 14), then the tooth 96a engages the edge of the bossed end 168 to rotate slightly the pinion, the shaft 91 and the chuck 86 in a counterclockwise direction, as viewed in FIG. 14, until the next adjacent tooth (tooth 96b, FIG. 14) slides along the surface of the bossed end. The orientation of the pinion 92 is accomplished just prior to the welding of the wire 59 to the sleeve 48.

SEVERING STATION

With a bared portion of the wire 59 now welded to the sleeve 48 of the pin and sleeve subassembly 42 in the leading one of the workholders 63—63, the turntable 61 is indexed rotatably to position the chuck 86 of the leading one of the workholders in registration with a severing device, designated generally by the numeral 170, (see FIG. 15) at a third work station. At the third work station, the sleeve 48 of the pin and sleeve subassembly 42 is positioned between a pair of opposed, spaced cutting blades 171—171 of the severing device 170. One of the cutting blades 171—171 is supported from a frame 172 which is mounted on top of the circular top platform 68. The other one of the cutting blades 171—171 is mounted on a reciprocally movable carriage block 173 which is mounted on a stand 174 that is attached to the base 62. The carriage block 173 is rigidly attached to a rod 176 which is slidably mounted in bearing plates 177—177 which are attached to the top of the stand 174. An air cylinder 178 is mounted on the stand 174 between the bearing plates 177—177 and having a piston rod 179 extending therefrom and attached to the carriage 173.

Similarly, the one cutting blade 171 is mounted on a carriage block 181 that is attached to a forward end of a pair of spaced rods 182—182 which are slidably mounted in a pair of spaced plates 183—183 of the frame 172. Moreover, the block 181 is attached to one end of a pivotally mounted arm 184. The arm 184 is pivotally mounted at a center point thereof between a pair of spaced ears 186-186 which project from an upstanding portion of one of the spaced plates 174—174. The other end of the pivot arm 184 is pinned to an actuator rod 187. The actuator arm 187 extends over and above one of the workholders 63—63 positioned therebelow on the turntable 61 and has an end thereof pinned to an upstanding portion of the carriage block 173.

As the air cylinder 178 is actuated, the piston rod 179 is moved inwardly toward the turntable 61 to move the carriage block 173 and the cutting blade 171 attached thereto inwardly toward the chuck 86. As the block 173 is moved toward the turntable 61, the actuator rod 187 is moved toward the center of the turntable 61 to move pivotally the arm 184 in a clockwise direction, as viewed in FIG. 15, to move the lower end of the arm to the left and toward the chuck 86. As the lower end of the arm 184 is moved toward the workholder 63, the carriage block 181 and cutting blade 171 mounted thereon are moved inwardly toward the pin and sleeve subassembly 42 in the workholder 63 currently in position in the severing station. The cutting blades 171—171 cooperate to sever the bared end of the wire 59 on the leading (or clockwise) side of the pin and sleeve subassembly 42 currently in position in the severing station. After the wire 59 has been severed, the workholder 63 currently in the severing station has a pin and sleeve subassembly 42 held in the chuck 86 thereat with the bared end of the wire 59 welded to the sleeve 48 of the pin and sleeve subassembly and with the wire extending counterclockwise thereof past the pin and sleeve subassembly in the chuck currently in the wire feeding and welding station with the wire 59 continuing thereon to the supply spool 131.

As should be apparent, if the workholder 63, currently in the severing station, is the leading one of the

15 workholders, then a leading bared end of the wire 59 is welded to the sleeve 48 of the pin and sleeve subassembly 42. In that case, it is not until the leading one of the workholders 63—63 is indexed to a fourth work station and a next successive one of the workholders is indexed into the severing station that severance of the wire 59 occurs. Then, when the wire 59 is severed, a length of the wire extends from the pin and sleeve subassembly 42 in the leading one of the workholders 63—63 with the trailing end thereof held taut between the stud 82 and the boss 85 of the distributor arm 74. A new leading end of the wire 59 is welded to the sleeve 48 of the next successive pin and sleeve subassembly 42 in the cutting station 170 and extends counterclockwise therefrom as viewed in FIG. 1 to the wire supply spool 131.

SWAGING STATION

After the wire 59 has been severed from the leading side of a pin and sleeve subassembly 42 which is held in the workholder 63 in the third work station, the workholder currently in the severing station is indexed with the turntable 61 in a clockwise direction, as viewed in FIG. 2, to move the pin and sleeve subassembly into a fourth word station and into registration with a swaging device, designated generally by the numeral 190 (see FIG. 16).

It will be recalled that the pin and sleeve subassembly 42 has been formed prior to the assembly thereof with the shell and cap subassembly 43 in the apparatus 60 and has a somewhat flared peripheral edge on the upper portion of a sleeve 48. The flared peripheral edge of the sleeve 48 curves outwardly and must be swaged inwardly to conform generally with the surface of the cylindrical sleeve.

The swaging device includes a swaging tool, designated generally by the numeral 191, which is mounted on a bracket 192 which is attached to the top surface of the top platform 68. The swaging tool 191 is moved downwardly by an air cylinder 193 attached to a top portion of the bracket to engage the swaging tool and the sleeve 48 of the pin and sleeve subassembly 42.

The swaging tool 191 has a die cavity 194 formed in the lower end thereof. The die cavity 194 is concentric with the outer circumference of the sleeve 48 of the pin and sleeve subassembly 42. Moreover, the innermost portion of the die cavity 194 is rounded so that as the swaging tool 191 is moved downwardly over the sleeve 48, the curved outer rim portion of the sleeve is swaged inwardly by the wall of the die cavity.

As the swaging tool 191 is moved over the sleeve 48, currently positioned in the fourth work station to swage the rim of the sleeve, the cutting blades 171—171 at the cutting station are moved to sever the wire 59 from the supply tool 131. Consequently, at this time, the pin and sleeve subassembly 42 currently in registration with the swaging device 190 has a leading bared end of a wire 59 welded to the top portion of the sleeve 48 and has a predetermined length of insulated wire 59 extending in a generally counterclockwise direction with a trailing portion thereof held tensioned between the stud 82 and the boss 85 of the distributor arm 74.

16

WIRE WINDING

The rack 94 is positioned on the base 62 so that the pinion 92 on the shaft 91 of each of the workholders 63-63 engages initially the teeth of the rack when the workholder is moved out of registration with the swaging device 190. After the rim of the sleeve 48 is swaged by the swaging tool 191, the turntable 61 is indexed whereupon the pinion 92 engages the rack 94 to rotate the shaft 91 and the chuck 86. (see FIG. 18).

Figure 18:
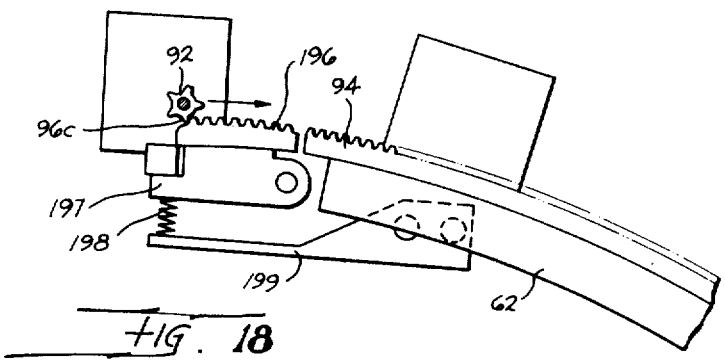
FIG. 18 is a detailed plan view showing the engagement of the pinion on the shaft extending from the chuck of each of the workholders with the rack on the underside of the turntable to rotate the chuck and the pin and sleeve subassembly held therewithin to wind the convolutions of wire on the sleeve as the distributor arm is moved pivotally.

As can be observed from FIG. 18, the rack 94 has a lead-in segment 196 which is attached to a pivotally mounted bar 197. The bar 197 is biased in a clockwise direction, as viewed in FIG. 18, by a spring 198 bearing on a lever 199 that is secured to the base plate 52. By this arrangement, the lead-in segment 196 yields and is moved pivotally in a counterclockwise direction should one of the teeth 96–96 (tooth 96c in FIG. 18) approach the rack segment so as to jam thereagainst. The yielding motion of the lead-in segment 196 facilitates the meshing of the pinion 92 with the rack 94.

The annular cam surface 69 varies from a height slightly above the level of the platform 68 from the first to the fourth work stations and then to a minimum winding height and back to a maximum winding height $h_1$ as the turntable is indexed from the fourth work station through a fifth work station and into a sixth work station at which ones of the mass of shell and cap subassemblies 43-43 are assembled to successive ones of the pin and sleeve subassemblies 42—42. from Moreover, the annular cam surface 69 is configured so that the height $h$ (see FIG. 13) of the cam surface is decreased gradually starting at a point on the cam surface directly above the point of engagement of the pinion 92 with the rack 94. Subsequently, the cam follower 78 riding on the cam surface 69 is urged upwardly to move pivotally the tension arm 74 and overcome the spring 79 to raise the trailing end thereof upwardly and distribute the convolutions of the wire 59 on the sleeve 48 of the pin and sleeve subassembly 42. In this way the distributor arm 74 is moved pivotally first in a clockwise and then in a counterclockwise direction, as viewed from outside the turntable 61, to array two layers of the wire 59 on the sleeve 48 on each of the pin and sleeve subassemblies 42—42.

Also, it will be recalled that a stud 82 in the workholder 63 cooperates with the boss 85 formed on the one end of the distributor arm 74 to hold the insulated wire 59 between the stud 82 and the top portion of the arm 74. Now, since the trailing end of the wire 59 has been severed, the winding of the wire 59 on the sleeve 48 of the pin and sleeve subassembly 42 pulls the wire between the stud 82 and the boss 85 of the tension arm 74. In this way, the tension device 81 serves to guide the wire 53 extending from the pin and sleeve assembly 42 as the distribution of the wire is made on the sleeve 48 of the pin and sleeve subassembly 42.

As the turntable 61 is indexed into the sixth work station, the pinion 92 is disengaged from the rack 94 and the cam follower 79 now resumes following a portion of the cam surface 69 which is generally planar with the top surface of the platform 68. Hence, the distributor arm 74 remains in a generally constant orientation with a portion of the wire 59 which has been wound on the sleeve 48 held taut by the stud 82 at the trailing end of the arm.

SHELL ASSEMBLY AND WIRE STRIPPING STATION

Following the winding operation, the pin and sleeve assembly 42 with the wire 59 around about the sleeve 48 thereof is advanced with the workholder 63 into the sixth work station which includes a stripping device, designated generally by the numeral 200, and a shell subassembly feeding and assembly device, designated generally by the numeral 210 (see FIG. 2). As can best be seen in FIGS. 20 and 21, the stripping device 200 includes a cutting blade 201 similar to the cutting blade 141 on the wire feeding and stripping device 130, and which is mounted on a reciprocally movable slide 202. The slide 202 has an end which is external to the turntable 61 and extends through a guide block 203 supported on the base plate 62 and has the other end thereof connected to one end of a rocker arm 204. The rocker arm 204 is connected at the other end thereof to a piston rod 205 extending from an air cylinder 206. Upon actuation of the air cylinder 206, the rocker arm 204 is turned in a clockwise direction, as viewed in FIG. 20, about a pin 207 to move slidably the stripping blade 201 inwardly to engage the insulated wire 59 and to then move the stripping blade a short distance laterally of the chuck 86 in a counterclockwise direction, as viewed in FIG. 20, to strip a predetermined length of insulation from the wire. The lateral motion of the stripping blade 201 is accomplished as a pin 208 which extends upwardly from the slide 202 rides in a cam slot 209 in the guide block 203.

The shell subassembly feeding and assembling device 210 feeds successive ones of a mass of the shell and cap subassemblies 43—43 from a vibratory bowl feeder 211 (see FIG. 19) into position over successive ones of the pin and sleeve subassemblies 42—42 currently in registration therewith. The bowl feeder 211 is mounted on a stand 213 which is supported on the base 62 and which is independent of a frame 214 which supports the elements for assembling the shell and cap subassemblies 43—43 with the pin and sleeve subassemblies 42—42.

The shell and cap subassemblies 43-43 are moved along a track (not shown) in the bowl to engage successive ones of the open ends 52—52 thereof with a fin (not shown). Air blasts are pulsed against the leading assembly 43 until the slot thereof is aligned with the fin (not shown). Then the assemblies 43—43 are moved from the vibratory bowl feeder 211 along an inclined feed track 212 so that the open end 52 of each of the shells 43—43 is oriented toward the turntable 61, and are maintained with the slots 53—53 thereof in the desired orientation by virtue of a fin 216 which is attached to the inclined track 212 and continues along the track from the bowl feeder 211 (see FIG. 19). At the lower end of the inclined feed track 212, the track curves downwardly so that the leading ones of the shell and cap subassemblies 43—43 are positioned with the longitudinal axes thereof being oriented vertically. The leading one of the shell and cap subassemblies 43—43 is engaged by a lip 217 (see FIGS. 19 and 22) extending from a pivotally mounted escapement member 218. The lip 217 of the escapement member 218 is biased inwardly toward the feed track 211 by a spring 219.

The pivotally mounted escapement member 218 cooperates with a reciprocally movable escapement pin 221 which has one end thereof secured to a block 222 that is attached to a piston rod 223 extending from an air cylinder 224. The air cylinder 224 is mounted on a vertical plate 225 which is supported on the frame 214. Moreover, the piston rod 223 also has a bracket 226 attached thereto for actuating a limit switch 404 for controlling the operating of the apparatus 60. Upon actuation of the air cylinder 224, the other end of the escapement pin 221 is received in an opening 227 in the feed track 212.

Figure 22:
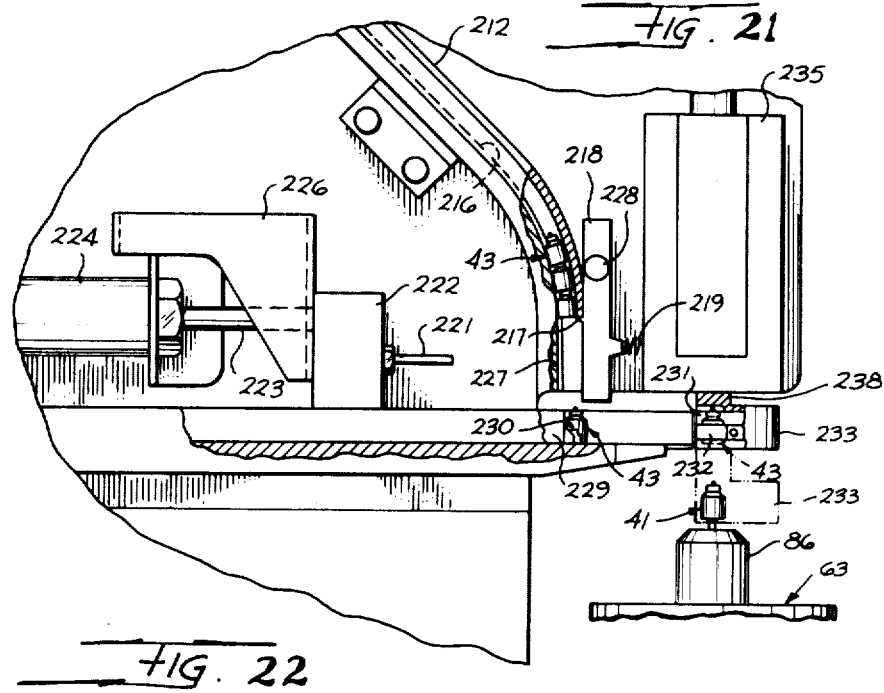
FIG. 22 is an enlarged elevational view of a portion of the shell subassembly feeding and assembly device of FIG. 19 for the escapement of the shells into a shell placement slide.

In operation, after the leading one of the shell and cap subassemblies 43—43 comes to rest on the lip 217, the reciprocally movable escapement pin 221 is moved through the opening 227 in the feed track 211 to span the feed track and engage a lower end of the pivotally mounted escapement member 218 to pivot the escapement member in a counterclockwise direction about a pin 228, as viewed in FIG. 22, against the spring 219. The leading one of the shell and cap subassemblies 43—43 is released from the lip 217 and comes to rest on the pin 221.

Then as the escapement pin 221 is withdrawn to the left, as viewed in FIG. 22, and back through the opening 227 in the feed track 212, the escapement member 218 is moved pivotally in a clockwise direction, as viewed in FIG. 22, about a pin 228 by the spring 219 and the next successive one of the shell and cap subassemblies 43—43 comes to rest against the lip 217 thereof. The leading one of the shell and cap subassemblies 43—43, resting on the escapement pin 221, drops vertically downward upon withdrawal of the pin and comes to rest in an opening in a slide 229. The slide 229 has a fin 230 (see FIG. 22) extending into the opening and which represents a continuation of the fin 216 in the feed track 212 for maintaining the shell and cap assemblies 43—43 in the desired orientation.

The slide 229 is attached to the block 222 so that as the air cylinder 224 is actuated to move slidably the pin 221 to the right, as viewed in FIG. 22, and radially inward toward the turntable 61, the leading one of the shell and cap subassemblies 43—43 in the opening in the slide is positioned over the pin and sleeve subassembly 42 in the chuck 86 currently in registration with the sixth work station. The radially inward movement of the slide 229 moves the shell and cap subassembly 43 into a nest 231 formed between opposed inwardly biased spring fingers 232—232 in lower portion of a block 233 aligned vertically with the chuck 86. The spring fingers 232—232 hold the shell and cap subassembly 43 in alignment with the chuck 86 upon withdrawal of the slide 229.

When the one of the shell and cap subassemblies 43—43 is aligned with, and spaced above, the pin and sleeve subassembly 42 held in the workholder 63 currently in registration with the shell subassembly feeding and assembly device 210, an air cylinder 234 mounted on the vertical plate 225 is actuated to move a piston rod 236 and an upper portion of the block 233 downwardly and slidably through a guide 235. The block 233 is moved downwardly until the block engages a stop 237 which prevents further downward movement of the block. At that time the shell and cap subassembly 43 held within the nest 231 in the block 233 is positioned over, but not in engagement with, the pin and sleeve subassembly 42 in the chuck 86.

However, the stop 237 does not prevent further downward movement of an assembly ram 238 which is spring mounted on the block 233. The assembly ram 238 pushes the sheel and cap subassembly 43 through the nest 231 in the block 233 into engagement with the pin and sleeve subassembly 42, so that the ridges in the knurled end 46 of the pin 44 cut into the plastic material of the closed end 49 of the shell 51 to hold the pin 44 therewithin. A back-up plate (not shown) is mounted on the base 62 and aligned with the assembly ram 238 to support the shaft 91 of the workholder 63 to prevent vertical deflection of the pin and sleeve subassembly 42. As the piston rod 236 is moved downwardly an actuator bracket 239 engages and operates a limit switch 411 for controlling the operation of the apparatus 60 (see FIG. 19).

The operation of the air cylinders 206 and 234 is accomplished simultaneously so that while the stripping device is removing the insulation from a portion of the wire 59 extending from the sleeve 48, the slide 229 is simultaneously moved radially inward over and spaced above the chuck 86 to position a shell and cap subassembly 43 in the nest 231. After the portion of the wire 59 has been stripped and after the slide 229 has been moved forwardly over the chuck 86, the air cylinders 206 and 234 are returned to an unoperated position to retract the stripping device 200 from the turntable 61 and the slide 229 from the position in registration with and spaced above the chuck 86. At this time, the length of wire 59 is wrapped about and extends from the sleeve 42 of the pin and sleeve subassembly 48 in the chuck 86 to the tensioning device 81 on the workholder 63 with a portion of the wire between the sleeve and the tensioning device having the insulation removed therefrom. The pin and sleeve assembly 42 with the wire 59 wound thereon is then in condition to receive one of the shell and cap subassemblies 43—43 by operation of the ram described hereinbefore.

As the cycle of operation of the stripping device 200 and the shell subassembly feeding and assembly device 210 is completed at the sixth work station, the pin and sleeve subassembly 42 has a wire 59 wrapped around the sleeve 48 thereof with a bared portion thereof extending through the slot 53 in the cylindrical plastic shell 51 (see FIG. 8) which has been placed over the pin and sleeve subassembly now held within the chuck 86. The wire 59 extends in a counterclockwise direction from the sleeve 48 and held taut by the tensioning device 81. In order to complete the assembly of the heat coil assembly 41, it is then necessary to weld the bared portion of the wire 59 extending through the slot 53 to the metal cap 56 on the now upwardly oriented portion of the shell 51 (see FIG. 9). At this time also, it should be observed that the cam surface 69 on the platform 68 is substantially parallel with the platform and having a minimum thickness $h_1$ so that the distributor arm 74 is substantially horizontal.

WELDING AND WELD TEST STATION

After one of the shell and cap subassemblies 43—43 has been assembled to the pin and sleeve subassembly 42 in one of the workholders 63—63, the turntable 61 is indexed rotatably in a clockwise direction to move the workholder into a seventh work station and into registration thereat with a welding and weld test device, designated generally by the numeral 240 (see FIG. 2). The welding and weld test device 240 welds the bared portion of the extending part of the wire 59 to the metal cap 56 on the plastic shell 51 and then tests the strength of the weld to the cap.

Figure 23:
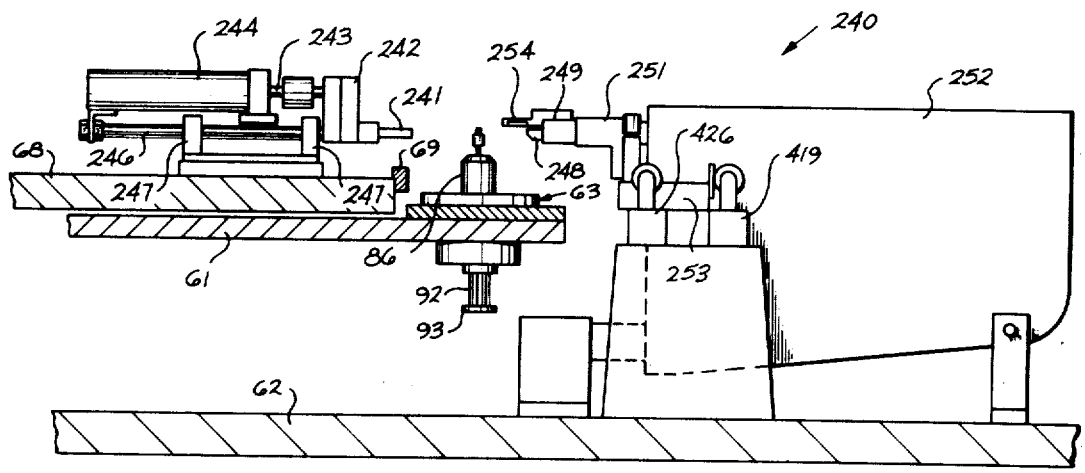
FIG. 23 shows an enlarged sectional view of a welding and weld test station of the apparatus of FIG. 2 taken along line 23—23 thereof and illustrating a welding device for welding a portion of the wire extending from the pin and sleeve subassembly to the cap of the shell and cap subassembly which is assembled to the pin and sleeve subassembly and being provided with facilities for testing the strength of the weld upon the return movement of the welding device to an unoperated position.

Referring now to FIG. 23, there is shown the welding and weld test device 240 which includes an anvil electrode 241 which is mounted on a slidably movable speed 242 that is attached to an end of a piston rod 243 which is operated by air cylinder 244. The air cylinder 244 is mounted on spaced carriage rods 246—246 supported in a pair of spaced bearing blocks 247—247 that are secured to the peripheral portion of the top platform 68.

The welding and weld test device 240 also includes a welding electrode 248 that is mounted on a head 249 of a reciprocally movable carriage 251. The reciprocally movable carriage 251 extends into a housing 252 that is attached to a top portion of the base plate 62. The spaced anvil and welding electrodes 241 and 248, respectively, are positioned so that the electrodes engage the metal cap 56 attached to the plastic shell 51 and the bared portion of the wire 59 to complete a circuit to weld the bared portion of the wire to the cap. Finally, the welding and weld test station includes an actuator bracket 253 which is attached to the reciprocally movable carriage 261 for actuating limit switches 419, 424 and 426 (see FIGS. 2 and 32) for controlling the operation of the apparatus 60.

Figure 25:
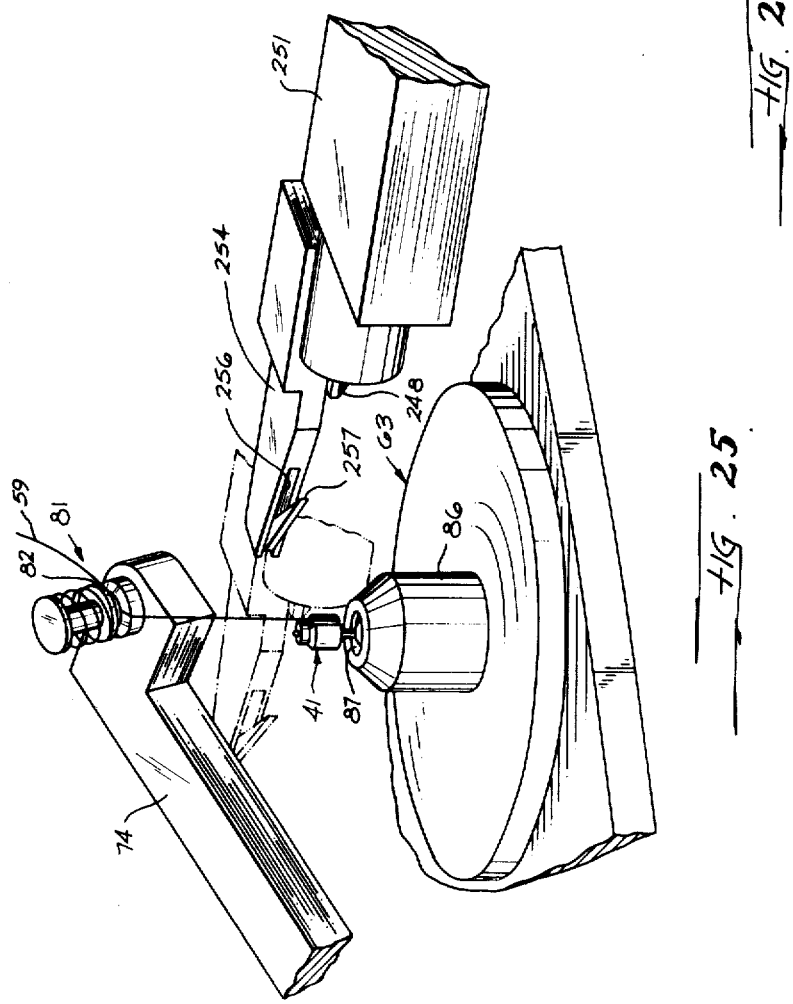
FIG. 25 is an enlarged perspective view of the facilities provided at the welding and weld test station of FIG. 23 for testing the weld of the wire to the cap of the shell and cap subassembly in which a pawl is moved pivotally by the magnetic field which is established during the weld to engage the wire and impart a pulling force thereto to test the strength of the weld of the wire to the cap.

Moreover, the carriage 251 also includes a cantilevered member 254 that extends above and over the welding electrode 248 (see FIGS. 23 and 25). The cantilevered member 254 has a slot 256 formed therein for receiving a pivotally mounted pawl 257. The pawl 257 normally extends outwardly (see broken line position of pawl in FIG. 25); however, the pivotal movement is limited by a stop (not shown) within the slot 256 so that an acute angle is formed between the pawl in the normal outward position and the cantilevered member 254. When the carriage 251 is moved longitudinally over the chuck 86 and transversely of the axis of the wire 59 to engage the welding electrode 248 with the wire, the pawl brushes past the length of the wire between the pin and sleeve subassembly 42 and the tensioning means 81 to move pivotally the pawl, in a counterclockwise direction, as viewed from a top plan view of FIG. 30, within the slot 256.

Figure 24:
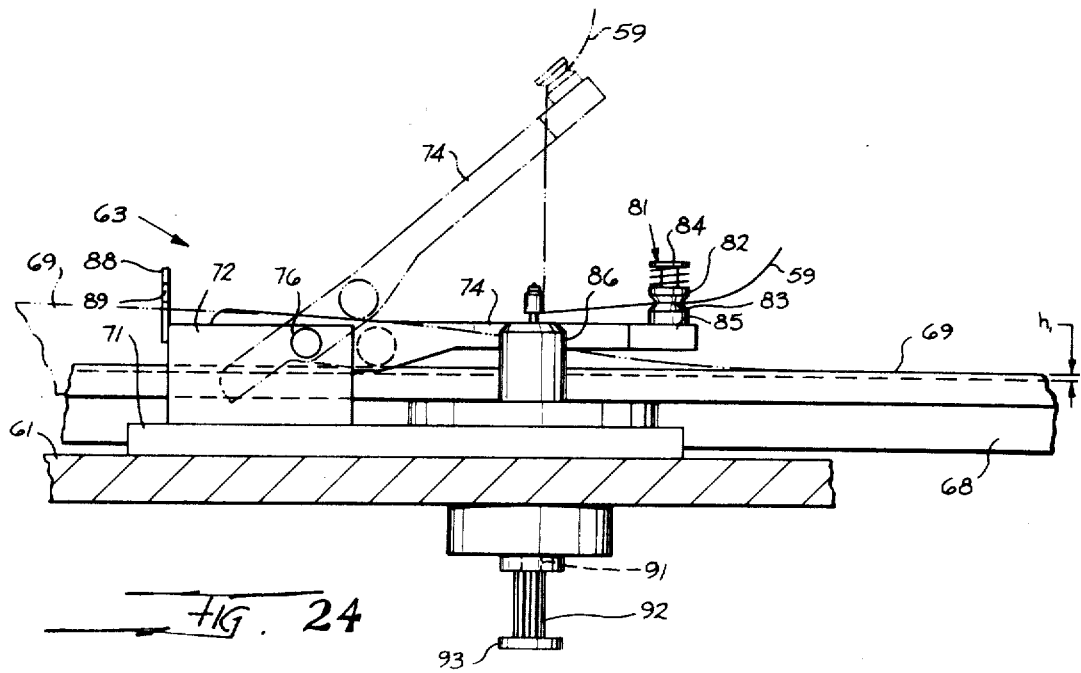
FIG. 24 is an enlarged elevational view of one of the workholders of the apparatus of FIG. 2 taken along line 24—24 thereof and illustrating the upward movement of the distributor arm on the workholder to push a portion of the wire extending from the pin and sleeve subassembly in approximate engagement with the cap of the shell and cap subassembly assembled to the pin and sleeve subassembly which is positioned in the workholder to facilitate welding of the wire to the cap.

It should be observed from FIGS. 24 and 25 that the pawl 257 is capable of being moved pivotally by the wire 59 since, at this portion of the circular top platform 68, the cam surface 69 is raised substantially in contour to a maximum height above the surface of the platform, and above that height, at the conclusion of the winding operation, so that the distributor arm 74 is moved in a clockwise direction (as viewed in FIG. 24) to position the tension device 81 above the electrodes 241 and 248.

With the distributor arm 74 in an upper inclined position, the wire 59, extending from the slot 53 to the tensioning device 81, is at an inclined position so that a portion of the bared wire is adjacent to the metal cap 56 (see FIG. 25). Then, when the electrodes 241 and 248 are brought into welding position over the chuck 86, the anvil electrode 251 engages the cap 56 and the welding electrode engages the bared portion of a wire 59 and moves the bared wire into engagement with the cap 56, whereupon the welding circuit is completed to weld the wire to the cap.

As the bared portion of the wire 59 is welded to the cap 56, a magnetic field is established in the vicinity of the weld and is utilized to test the strength of the weld. The establishment of the magnetic field attracts the pawl 257 to move pivotally the pawl out of the slot 256 to an outer normal position (see broken line position of pawl, FIG. 25). Then after the weld has been completed and the anvil and welding electrodes 241 and 248, respectively, are withdrawn from the welding position, the carriage 251 is moved out from over the chuck 86. As the carriage 251 is withdrawn from the position over the chuck 86, the pawl 257, then in a normal outward position by virtue of the magnetic field, engages the wire 59 and exerts a pulling force on the wire. The force, imparted by the pawl 257 to the wire 59, is sufficient to break the wire at the point of weld (see FIG. 9). However, should the weld be defective the wire 59 will not break at the weld, but rather the wire is pulled out of engagement with the cap 56. Hence, the welding and weld test device 240 performs a dual function in performing a test of the strength of the weld subsequent to the welding of the wire 59 to the cap 56 of the shell and cap subassembly 43.

After the remaining length of the bared portion of the wire 59 has been broken from the weld at the cap 56, there remains a short portion of the wire depending downwardly from the tension device 81 of the distributor arm 74 (see FIG. 25). It will be recalled that this portion of the wire is held confined between the stud 62 and the boss 85 on the distributor arm 74. This remaining portion of the wire 59 is removed at a subsequent work station following the ejecting of the heat coil assembly 41 from the apparatus 60.

TESTING AND SORTING STATION

Figure 26:
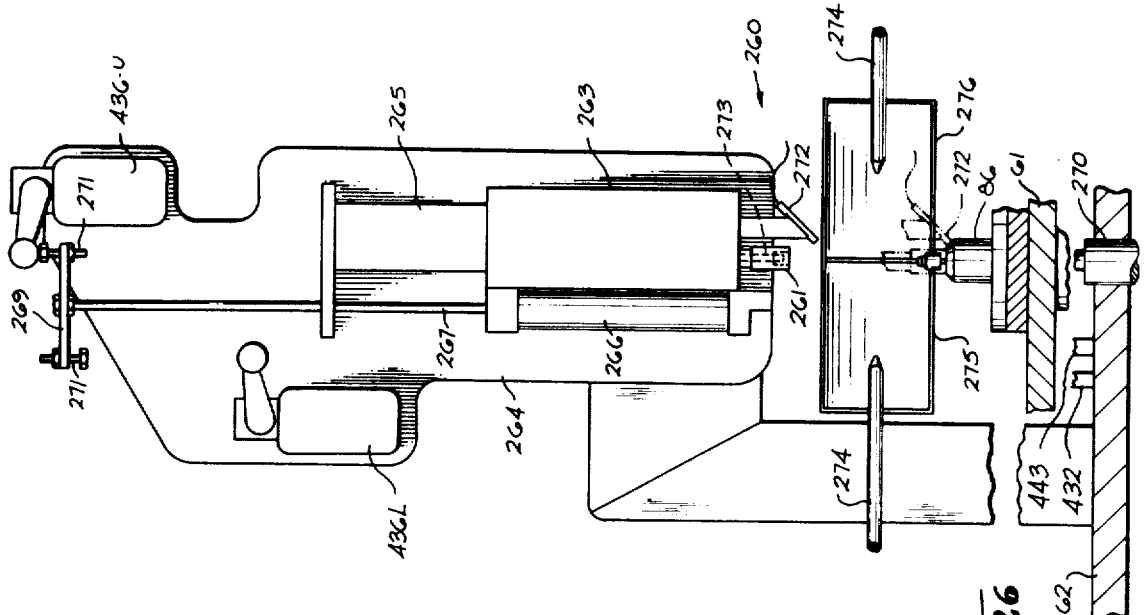
FIG. 26 is an enlarged sectional view of a testing and sorting device of the apparatus of FIG. 2 taken along line 26—26 thereof and illustrating a device for removing successive ones of the heat coils from the workholders and for testing and then sorting the successive ones of the heat coils.

After the bared portion of the wire 59 is welded to the cap 56, the turntable 61 is indexed rotatably in a clockwise direction to move the workholder 63 and chuck 86 to the final station and into registration with a testing and sorting device, designated generally by the numeral 260 (see FIGS. 2 and 26). As the workholder 63 is indexed into the final work station, the chuck 86 is moved into registration with a vertically movable collet chuck 261. The collet chuck 261 has a plurality of split fingers 262—262 at a lower end thereof and which cooperate to form a cavity therebetween for receiving and holding individual ones of the heat coil assemblies 41—41. The collect chuck 261 is mounted slidably in a housing 253 which is secured to a frame 264 supported on the base 62.

The collect chuck 261 is attached to a plunger 265 which is moved downward by an air cylinder 266 that is mounted on the frame 264. The air cylinder 266 has a piston rod 267 extending vertically upward therefrom and through an opening in a plate 268 up to an end arm 269. The end arm 269 has a pair of spaced studs 271—271 mounted thereon for actuating a limit switch 436 and a limit switch 443, respectively. The plate 268 is connected to an upper end of the plunger 265 which is movable slidably by the piston rod 267 into or out of the housing 263. Moreover, the fingers 262—262 of the collet chuck 261 are biased normally upward by a compression spring (not shown). Initially, as the plunger 265 is moved downwardly the fingers 262—262 are opened. Then, as the plunger is moved further downwardly, the collet chuck 261 is moved over the heat coil assembly 41 (see broken line position of the collet chuck in FIG. 31) to position the heat coil assembly between the fingers.

When the heat coil assembly 41 is received between the split fingers 262—262, an electrical connection is established between the metal cap 56 and a test circuit (not shown). The test circuit (not shown) is completed by a ground connection from an electrode 272 to the chuck 86 when the collet chuck 261 is in a lower position (see FIG. 26), and is used to determine a electrical test characteristic, such as resistance, of the heat coil assembly 41.

Then the air cylinder 266 is actuated to move the plunger 265 upwardly and an air cylinder 270 actuated to move a block and plate arrangement, similar to that shown in FIG. 10, downwardly to engage the collar 93 and pull the collar downwardly to open the chuck 86 and permit the pin and sleeve subassembly 42 to be withdrawn therefrom. As the plunger 265 is moved upwardly, the plunger engages the collet chuck 261 and moves the collet chuck and the heat coil assembly 41 held therein to an upper position.

After the collet chuck 261 has been moved upwardly through a predetermined distance, the chuck is urged against a stationary pin 273 which is attached to the housing 263 and extends into the collet chuck. Further movement of the collet chuck 261 in an upward direction causes the pin 273 to spring open the collet chuck to permit the heat coil assembly 41 to drop by gravity from between the fingers 262—262 of the collet chuck. As the heat coil assembly 41 descends from between the fingers 262—262, a pneumatic circuit (not shown) is selectively completed to one of a pair of spaced tubes 274—274 in accordance with the test characteristic to direct a blast of air against the heat coil assembly 41 to move the heat coil assembly into an accept bin 275 or a reject pin 276.

After the heat coil assembly 41 has been removed from the workholder 63 at the testing and sorting station, the workholder is indexed through a scrap wire discarding device 277 (see FIG. 2) to the first work station for another cycle of operation. The annular cam surface 69 on the top circular platform 68 is contoured down from the welding and weld test station toward a surface generally at the same level as the surface of the platform, whereupon the distributor arm 74 is urged downwardly by the spring 79 within the block 72 on the workholder 63. As the distributor arm 74 is urged downwardly in a clockwise direction, as viewed externally of the turntable 61 so that the distributor arm is substantially horizontal, the distributor arm passes the scrap wire discarding device 277.

The scrap wire discarding device 277 is used to remove the remaining unused portion of the wire 59 from the workholder 63 and includes a bar 278 having a tapered end. As the workholder 63, now empty except or the remaining portion of the trailing end of the wire held within the tensioning device 81, is moved indexably from the testing and sorting station, the tapered end of the bar 278 is forced between the stud 82 and the boss 85 on the top surface of the distributor arm 74. As the tapered end of the bar 278 is urged under the stud 82, the stud is forced upwardly against the spring mounted screw 84 on the tension device 81 of the workholder 63. The expansion of the groove between the stud 82 and the boss 85 permits the loose end of the wire 59 to be blown from the workholder 63 by a air blast from a tube 279. Now the workholder 63 is devoid of any workpiece or work material and is in condition to receive a new pin and sleeve subassembly 42 from the pin and sleeve subassembly feeding device 100 at the first work station.

ALTERNATIVE EMBODIMENT — COMBINED SEVERING AND SWAGING STATION

In accordance with the principles of this invention, the wire cutting and the swaging devices 170 and 190, respectively, may be replaced by a combined severing and swaging device, designated generally by the numeral 280 (see FIG. 27). The combined cutting and swaging device 280 includes a stand 281 which is supported on the base 62. The stand 281 includes a pair of spaced, antilevered arms 282—282 for holding an air cylinder 283 therebetween. The air cylinder 283 has a piston rod 284 extending downwardly therefrom and secured rigidly to a tool block 286. Moreover, the tool block 286 is also secured to one end of a rod 287 which is slidably mounted in openings in the spaced arms 282—282 and which has a collar 288 attached to an upper end thereof for limiting the descent of the rod.

The construction of the cutting and severing device 280 can be further described by referring to FIG. 28 where it is seen that an air cylinder 285 is mounted on the tool block 286 and is connected to an actuator ram 289. The actuator ram 289 is mounted slidably in a bore 291 of a tool holder 292 with the bore 291 off-center from the vertical center line of the chuck 86 currently in registration with the severing and swaging station. As can best be seen in FIG. 28, the tool holder 292 includes a swaging tool 293. The swaging tool 293 has a beveled opening formed in the lower portion thereof for receiving the top rim portions of the sleeve 48 of the pin and sleeve subassembly 42 held in the chuck 86.

The air cylinder 283 is actuated and swaging tool 293 is moved downwardly until the collar 288 engages the top one of the arms 282—282 whereupon the pin 44 is received in a stepped bore 294 and urges a headed seating pin 295, which is biased downwardly normally by a spring 296, upwardly with the bore. Moreover, a member 297 which is rigidly attached to the underside of the tool holder 292 engages the wire 59 immediately adjacent the joint of the wire and the sleeve 48. If the weld of the wire 59 to the sleeve 48 is acceptable, the member 297 breaks the wire immediately adjacent the joint. The breaking of the wire 59 immediately adjacent the joint on the sleeve 48 eliminates any possible shorting-out problem which may occur when the use of the cutting blades 171—171 to sever the wire 59 leaves a short portion of the wire extending beyond the joint.

The air cylinder 285 is also operated so that as the tool block 286 is being retracted the cylinder rod 285 moves the ram 289 into engagement with a pivotally mounted cutting blade 298 which is normally spring biased in a counterclockwise direction, as viewed in FIG. 28. As the cutting blade 298 is moved pivotally in a clockwise direction, the cutting blade cooperates with a cutting blade 299 which is rigidly attached to the tool block 286 (see FIGS. 28 and 31). If the joint is effective and the wire 59 broken by the member 297, the trailing end of the preceding length of wire moves out from between the blades 298 and 299, and although the blade 298 is actuated, the blades do not sever the wire. If the joint is deflective, the blades 298 and 299 cut the wire 59 at the joint adjacent to, but spaced from the defective joint.

As the tool block 286 is moved upwardly, there is a tendency for the pin and sleeve subassembly 42 to be retained in the stepped bore 294 and pulled out of the chuck 86. To overcome this, the headed seating pin 295 is urged downwardly by the spring 296 in the bore 294 to impart a pushing force thereto to eject the pin and sleeve assembly 42 and to maintain the pin 44 seated in the chuck 86 and avoid undue stresses in the pin and sleeve subassembly.

CONTROL SYSTEM AND OPERATION

In describing the operation of the apparatus 60 for assembling the heat coil assemblies 41—41, reference is made to FIG. 33 which shows an electrical control circuit, designated generally by the numeral 300, for controlling the operation of the apparatus. The electrical control circuit 300 includes a power source 301 having main feeder lines 302 and 303 for supplying power to a plurality of circuit components.

Initially, an operator depresses a push button switch 304 to complete a circuit from the source of power 301, through a line 307, and through the contact of the depressed push button switch, through a master start relay 306 to the line 303 and then back to the power source to energize the master start relay. The energization of the master start relay 306 closes a normally open contact 306-1 and a normally open contact 306-2. The closing of the contact 306-1 completes a circuit from the power source 301 along the line 307, through the now closed contact 306-1 to energize the winding of a main air valve solenoid 305. Moreover, the closing of the counter 306-1 completes a circuit through a push button switch 308 to complete a circuit from the line 307 through a relay 309, through a relay 311 and through a relay 312 to the line 303, and back to the power source 301 to energize the relays 309, 311 and 312. (see FIG. 33A).

The energization of the relay 309 closes a contact 309-1 to condition a circuit from the source 301 of power along the line 307 and then along a line 310 for the subsequent operation of returning the cutting blades 171—171 at the third work station. The energization of the relay 309 also opens a normally closed contact 309-2 to disable a circuit from the line 307 through a line 315 and through a relay 402 for the operation of the air cylinder 224 for the placement of one of the shell and cap subassemblies 43—43 over one of the pin and sleeve subassemblies 42—42 in one of the chucks 86—86. The energization of the relay 309 closes a normally open contact 309-3 to condition a circuit from the line 307 through a relay 414 to return the assembly ram 238 from the shell assembly position. Also, the energization of the relay 309 opens a normally closed contact 309-4 to disable a circuit from the line 315 through a relay 421 which advances the anvil electrode 241 of the welding and weld test station 240.

The energization of the relay 309 also opens a normally closed contact 309-5 to disable a circuit from the line 315 through a relay 431 for advancing the collet chuck 261 of the testing and sorting device 260 into engagement with one of the heat coil assemblies 41—41. Further, the energization of the relay 309 closes a normally open contact 309-6 to enable a circuit from the line 307 through a relay 438 for returning the collet chuck 261 to a normal unoperated upper position and for opening the collet chuck to permit the heat coil assembly held therein to drop therefrom.

The energization of the relay 311 closes a normally open contact 311-1 to enable a circuit from the line 307 for the energization of a relay 327 to initiate the index cycle of operation, and opens a normally closed contact 311-2 to disable a circuit through a time delay relay 323 and to disable a bypass circuit through the relay 327. The energization of the relay 311 opens another normally closed contact 311-3 to disable a circuit from the line 307 through a relay 341 for the advancement of the slide 116 to position one of the pin and sleeve subassemblies 42—42 over one of the chucks 86—86 and for opening the chuck. The energization of the relay 311 closes a normally open 311-4 to enable a circuit from the line 310 through a time delay relay 347. Moreover, the energization of the relay 311 closes a normally open contact 311-5 to enable a bypass circuit from the line 307 through a relay 354 for returning the insert ram 121, and opens a normally closed contact 311-6 to disable a circuit from the line 315 through a relay 363 to the line 303 for the operation of the wire feeding and stripping device 130. The energization of the relay 311 also opens a normally closed contact 311-7 to disable a circuit from the line 315 through a relay 371 which controls the advancement of the anvil electrode 151 of the welding device 150, and also opens a normally closed contact 311-8 to disable a circuit from the line 315 through a relay 381 to the line 303 for the advancement of the cutting blades 171—171 of the cutting device 170.

The energization of the relay 312 opens a normally closed contact 312—1 to disable a circuit from the line 307 for the operation of the pin and sleeve subassembly feeding device 100, and opens a normally closed contact 312-2 to disable a circuit from the line 307 through a solenoid 362 to the line 303 for the operation of the hold-down bars 137—137 of the wire feeding device 130. Moreover, the energization of the relay 312 opens a normally closed contact 312-3 to disable a bypass circuit from the line 310 through a time delay relay 366 and through a solenoid 367 for the advance of the wire stripping blade 141. (see FIG. 33H)

The operator depresses a cycle start push button switch 313 to complete a circuit from the source of power 301, along the line 307 and the normally open, now closed, contact 306-1, through the push button switch 308, through a normally closed contact 314-1 of a relay 314, through the now depressed switch 313 and through a cycle start relay 316 to the line 303 to energize the relay 316. The energization of the relay 316 closes a normally open contact 316-1 to complete a circuit from the line 307 and through the now closed contact 306-1, the push button switch 308, and through a contact 314-1, bypassing the switch 313, and through the now closed contact 316-1 to illuminate a lamp 317. Moreover, the energization of the relay 316 opens a normally closed contact 316-2 to disable a circuit through a pushbutton switch 318 for cycling the heads or work tools at the work stations. (see FIG. 33A).

The energization of the relay 316 also closes a contact 316-3 to enable a circuit from the line 307 through the now closed contact 306-2 for the energization of a relay 325 to operate clutch (not shown) to index the apparatus 60. Moreover, the energization of the relay 316 closes a contact 316-4 to complete a bypass circuit from the line 307, around the normally closed, now open, contact 312-1 to the line 303 for the operation of the vibratory pin and sleeve subassembly feeding device 100.

The closing of the contact 306-1 completes a circuit from the source of power 301, along the line 307, through the now closed contact 306-1, through a normally closed contact 324-1 of a latching relay 324 and through a normally closed contact 326-1 of a relay 326, and then through a time delay relay 319 to the line 303 to energize the relay 319. The energization of the time delay relay 319 closes instantaneously a normally open contact 319-1 to enable a circuit through a normally open contact 326-2 and the now closed contact 319-1 to energize a relay 321 to cycle the heads or the work tool at the work stations.

The energization of the relay 321 closes a normally open contact 321-1 to enable a holding circuit from the source of power 301, along the line 307, through the now closed contact 306-2, through a normally open contact 326-4 of the relay 326 and through a normally closed contact 333-1 of a relay 333, along feeder line 315, through the now closed contact 321-1 and a normally closed contact 347-2 of the time delay relay 347 to hold in the relay 341 for advancing the slide 116 and for operating the air cylinder 126 to move downwardly the shaft 91 and open the collet chuck 86. Moreover, the energization of the relay 321 closes a normally open contact 321-2 to enable a circuit from the source of power 301, through the line 307 and through the now closed contact 306-2, through the normally open contact 326-4 and the normally closed contact 333-1 and then along the line 315 and through the now closed contact 321-2 and a normally closed contact 366-2 of the time delay relay 366 and through the relay 363 to the line 303 for advancing the wire stripping blade 141. The energization of the relay 321 also closes a contact 321-3 to enable a circuit from the line 315, through a normally closed contact 375-2 of a relay 375 and through the relay 371. Also, the energization of the relay 321 closes a contact 321-4 to enable a circuit from the line 315, through the now closed contact 321-4 and a normally closed contact 384-2 of a relay 384 and through relay 381. (see FIG. 33D).

The energization of the relay 321 also closes a contact 321-5 to enable a circuit from the line 315, through now closed contact 321-5 and a normally closed contact 406-1 of the relay 406 and trough relay 402 for controlling the operation of the air cylinder 224 to move the shell placement slide 229. The energization of the relay 321 closes a normally open contact 321-6 to enable a circuit from the feeder line 315, through a normally closed contact 427-4 of a relay 427 and through a normally open contact of an unoperated limit switch 424, which is operated by the advance of the anvil electrode 241, and through a relay 42 to the line 303. The energization of the relay 321 closes a normally closed contact 321-7 to enable a circuit from the line 315, through the now closed contact 321-7 and a normally closed contact 437-1 of a time delay relay 437, which controls the operation of the advancement of the collet chuck 261 of the testing and sorting device 260, through the relay 431 and to the line 303 and then back to the source of power 301. (see FIG. 33F).

In an emergency, to return all stations to an unoperated position, the operator depresses a switch 332 to disable the circuit through the cycle start relay 316 and to complete a circuit from the feeder line 307, through the contact of the switch 332 and through a relay 333 to the line 303 to energize the relay 333. The energization of the relay 333 opens the normally closed contact 333-1 to disable the line 315 and all of the relay circuits connected thereto. Moreover, the energization of the relay 333 closes a normally open contact 333-2 to complete a circuit from the line 307, through a relay 352 and to the line 303 to energize the relay 352. The energization of the relay 352 closes a normally open contact 352-1 to complete a circuit from the line 307 through a solenoid 334 for retracting the pin and sleeve assembly slide 116.

The energization of the relay 333 closes a normally open contact 333-3 to complete a circuit from the line 307 through the relay 354 to the line 303 to energize the relay. The energization of the relay 354 opens a normally closed contact 354-1 to disable a bypass circuit for the energization of a relay 344 for actuating the insert ram 121. Also, the energization of the relay 354 closes a normally open contact 354-2 to complete a circuit from the line 302 through a solenoid 696 to energize the solenoid winding and retract the insert ram to an unoperated position. (see FIG. 33G).

The energization of the relay 333 closes a normally open contact 333-4 to complete a bypass circuit from the line 310 through a relay 386 to the line 303 to energize the relay 386. The energization of the relay 386 closes a normally open contact 386-1 to complete a circuit from the line 302 through a solenoid 387 to energize the winding thereof and return the cutting blades 171-171 to an unoperated position. (see FIG. 33H).

The energization of the relay 333 closes a normally open contact 333-5 to complete a circuit from the line 307 through the relay 406 to the line 303 to energize the relay 406. The energization of the relay 406 opens the contact 406-1 to disable a circuit for advancing the shell placement slide 229 and closes a contact 406-2 to complete a circuit from the line 407 through relay 406 to lock in the relay. Also, the energization of the relay 406 closes a contact 406-3 to enable a circuit from the line 307 through the contact 406-8 and a relay 407 for advancing the assembly ram 238; however, this circuit is rendered disabled by the opening of the normally closed contact 333-6 upon energization of the relay 333. The energization of the relay 406 closes a normally open contact 406-4 to enable a circuit through a pair of normally open contacts 413-3 and through a relay 413 for operating all of the work tools to full depth. Finally, the energization of the relay 406 closes a normally open contact 406-5 to complete a circuit from the line 302 through a solenoid 408 to energize the winding thereof to actuate and return the shell and cap subassembly placement slide 229 to a retracted position.

A photoelectric unit 328 (see also FIG. 19) is connected into the electrical control circuit 300 across the lines 307 and 303. Normally, when ones of the shell and cap subassemblies 43—43 appear in the lower portion of the inclined track 212, the light beam associated with the photoelectric unit 328 is broken and a contact 328-1 remains normally closed. Should a jam-up occur and there is no shell and cap subassembly 43 in the lower portion of the track 212, the light beam is unbroken and the contact is opened.

Then the operator throws a switch 329 to complete a circuit from the line 307 through an index motor 330 which is continuously running and which is rendered effective by actuation of the index clutch relay 325. (see FIG. 33A).

The return of all of the stations to an unoperated position actuates a plurality of limit switches. The return of the anvil electrodes 151 and 241 actuate the limit switch 379 and a limit switch 428, respectively, to close the normally open contacts thereof, while the return of the welding electrodes 152 and 248 operates limit switch 378 and limit switch 419, respectively, to close the contacts 378-A and 419-A thereof. The return of the cutting blades 171—171 operates a limit switch 383 to close the contact 183-B thereof, while the return of the stripping blade 201 operates a limit switch 418 to close the contact thereof. Moreover, the return of the collet chuck 261 operates the limit switch 443 to close the contact thereof.

When the pin and sleeve subassembly feeding device 100 is returned to an unoperated position, the collet chuck 86 is closed, which completes a circuit from the line 307, through a contact of a limit switch 349, through a relay 351 to the line 303 to energize the relay. The energization of the relay 351 closes a normally open contact 351-1 to enable a circuit for the return of the pin and sleeve subassembly placement slide 116 and closes a normally open contact 351-2. The closing of the contact 351-2 completes a circuit from the line 307, through contact 343-B, held closed, of a limit switch 343 and through a relay 353 to energize the relay. (see FIG. 33C).

Finally, the return of the shell and cap subassembly feeding and assembly device 210 to an unoperated position completes a circuit through a relay 412 to energize the relay. The energization of the relay 412 closes a normally open contact 412-1 and opens a contact 412-2 to disable a circuit for the energization of the shell placement slide 229 return relay 406. Also, the return of the testing and sorting device 260 to an unoperated position completes a circuit from the line 306 through a relay 441 to energize the relay. The energization of the relay 441 closes a normally open contact 441-1 in the all stations return circuit, and closes a normally open contact 441-2. The energization of the relay 441 also opens a normally closed contact 441-3 to disable a circuit through a relay 438 which is effective to return the collet chuck 261 of the testing and sorting device 260. (see FIG. 33G).

The energization of the relay 353 closes a normally open contact 353-1 to complete a circuit from the line 307, through the contacts of the now operated limit switches 379 and 428, the contact 378-A, a contact 383-B, the contact 418, the contact 419-A, the contact 443, through the now closed contact 353-1, through the now closed contact 412-1 and through the now closed contact 441-1 to the line 303 to illuminate a lamp 339 and to enable a circuit for operation of the index clutch relay 325.

From a previous cycle, upon actuation of all of the work tool heads to full depth, a circuit is completed from the line 307 through latching relay 324 to the line 303 to energize the relay. A coil 324-L of the latching relay 324 remains energized with the return of the work tools to an unoperated position until a coil 324-U thereof is energized to unlatch the relay. The energization of the relay 324 opens the normally closed contact 324-1 to de-energize the relay 319 and the relay 321. Also, the energization of the relay 324 closes a normally open contact 324-2 and completes a circuit from the line 307 and through a normally, now closed, contact 336-1 of a relay 336, which is energized by the depression of the push button switch 313, and through the now closed contact 316-3 and through a normally closed contact 323-1 of a time relay 323, through the relay 325 to the line 303 to energize the relay 325. The energization of the relay 325 closes a normally open contact 325-1 to complete a circuit from the line 302 through a solenoid 359 to energize the winding thereof. The energization of the solenoid 359 engages the index clutch 325 to index the turntable 61.

Also, the closing of the contact 324-2 and the contact 326-1 completes a circuit through a normally closed contact 326-3 and the normally open, now closed, contact 311-1 and a limit switch 338 and through the relay 327 to the line 303 to energize the relay. The energization of the relay 327 closes a normally open contact 327-1 to lock in a circuit through the relay 327 and closes a contact 327-2 to complete a circuit from the line 307 through the now closed contact 327-2 and a normally closed contact 323-2 of the time delay relay 323, through the limit switch 338 and through the relay 327 to maintain the relay energized after the latching relay 324 is dropped out. The energization of the relay 327 also closes normally open contacts 327-3 and 327-4 to condition the full depth and completes a circuit from the line 307 through coil 324-U of the relay 324 to the line 303 to unlatch the relay.

The energization of the relay 323 opens, on delay, normally closed contact 323-1 to disable the circuit through the index clutch relay 325 after the turntable 61 has been indexed, and opens a normally closed contact 323-2 to disable the circuit from the line 307 through the time delay relay 323.

The energization of the relay 324 closes the normally closed contact 324 to disable the circuit through the now closed contact 306-1 and the contacts 326-1 for cycling the heads and through the relay 319. Also, the energization of the relay 324 opens the normally open, now closed, contact 324-2 to disable the circuit from the line 307 through the now closed contact 336-1 to de-energize the index clutch relay 325.

After the turntable 61 has been indexed and the index clutch disengaged, and if the turntable has been indexed through a predetermined angle of rotation, the workholders 63—63 are precisely aligned with the work stations and a limit switch 340 is actuated by a spring biased indexing pin (not shown) on the base 62 which is urged into one of the plurality of holes (not shown) in the turntable that are aligned with the workholders. Should the turntable 61 not be indexed fully, the pin (not shown) will not engage one of the index holes (not shown) and the limit switch 340 is not actuated.

Provided the turntable 61 has been indexed fully, the limit switch 340 is actuated and a circuit is completed along the line 307, through the contact of the limit switch 340, and through a normally closed contact 444-1 of a relay 444, and through a relay 326 to the line 303 to energize the relay. The energization of the relay 326 opens the normally closed contact 326-1 to further disable the circuit through the time delay relay 319, while simultaneously closing normally open contact 326-2 to condition a circuit through the relay 321.

The energization of the relay 326 also opens the normally closed contact 326-3 to disable a circuit through the relay 327, and closes normally open contact 326-4 to put current on the lines 310 and 315. Finally, the energization of the relay 326 closes a normally open contact 326-5 to condition a circuit for the return stroke of the shell and cap subassembly placement slide 229.

Provided there is a supply of the shell and cap subassemblies 43—43 in the inclined track 212, the contact 328—1 of the photoelectric unit 328 is closed. The depression of the cycle start push button switch 313 is interlocked with a reset switch 345 to complete a circuit through the relay 336 and a running light 342. The completion of the circuit through the relay 336 energies the relay and closes the normally open contact 336-1 and a normally open contact 336-2. The closing of the contact 336-1 conditions the circuit from the line 307, through the normally open contact 314-2, the contact 316-3 and a normally closed contact 323-1, and through the relay 325. The closing of the contact 336-1 completes a holding circuit for the relay 336 once the operator releases the reset button 345.

The closing of the contact 316-4 completes a circuit from line 307 to the line 303, around the normally closed, now open, contacts 312-1 to energize a circuit to the vibratory bowl feeder 102. Then when the relay 316 drops out and the relay 312 is de-energized, the contact 312-1 is reclosed to maintain the circuit through the bowl feeder 102.

Referring now to FIG. 33, the closing of the contact 326-4 completes a circuit from the line 307, through the normally closed contact 333-1, along the line 315, through the now closed contact 321-1, and through the normally closed contact 347-2, and then through the relay 341 to the line 303 to energize the relay. The energization of the relay 341 closes a normally open contact 341-1 to complete a holding circuit from the line 315, through the normally closed contact 347-2 and the relay 341 after the relay 321 has been de-energized and the contact 321-1 reopened. Also, the energization of the relay 341 closes a normally open contact 341-2 to complete a circuit from the line 302 to the line 303 to energize a solenoid 391 for actuating the air cylinder 126 to move downwardly the block 128 and open the collet chuck 86 of the workholder 63 in registration with the feeding device 100. Finally, the energization of the relay 341 closes a normally open contact 341—3 to complete a circuit from the line 302 to the line 303 to energize a solenoid 392 to operate the air cylinder 117 to advance the slide 116 to position one of the pin and sleeve subassemblies 42—42 over the workholder 63 in registration with the feeding device 100.

As the collect chuck 86 is opened, and in the slide 116 is moved outwardly over the pin and sleeve subassembly 42 in the leading one of the workholders 63—63, the arm 120 actuates a limit switch 342 and a limit switch 343 (see FIGS. 10 and 32) are operated to close the contacts 342 and 343-A thereof and complete a circuit from the source of power 301, through the line 307, the now closed contact 326-4, the normally closed contact 333-1, along the line 315 and through the contacts of the operated limit switches 342 and 343, through the relay 344 and then along the line 303 back to the source of power. The completion of the circuit through the relay 344 energizes the relay to close the normally open contact 344-1 to complete a bypass circuit from the line 315, through the normally closed contact 354-1 of the relay 354, and then through the new closed contact 344-1 and through the relay 344 to the main line 303. The energization of the relay 344 also closes a normally open contact 344-2 to complete a circuit from the line 302 to the line 303 to energize the winding of a valve solenoid 393 to operate the air cylinder 122. The operation of the air cylinder 122 moves downwardly the insert ram 121 to move the pin and sleeve subassembly 42 through the nest 114 and into the chuck 86 of the leading one of the workholders 63—63.

As the insert ram 121 is moved downwardly, the insert ram actuates a limit switch 346. The actuation of the limit switch 346 completes a circuit from the power source 301, along the line 307, through now closed contact 306-2 and now closed contact 326-4, and then along the line 310, through the limit switch contact 346-A, and then through the time delay relay 347, then back along the line 303 to the source of power. The completion of the circuit through the relay 347 energizes the relay to close a normally open contact 347-1 to partially condition the full depth circuit for energizing the latching relay 324, and to open the normally closed contact 347-2. The opening of the normally closed contact 347-2 disables the bypass circuit through the contact 321-1 and de-energizes the relay 341 for advancing the slide 116. The energization of the time delay relay 347 also closes a normally open contact 347-3 to lock in a holding circuit from the line 310, through a push button switch 350 and through the time delay relay. Moreover, the energization of the relay 347 closes a normally open contact 347-4 to enable a circuit for the energization of the relay 352 to control the return movement of the slide 116, and closes a normally open contact 347-5 to condition a circuit from the line 307 through the normally held closed, now open, limit switch contact 343-B, through the now closed contact 311-5, through the now closed contact 347-5 and through the relay 354. (see FIG. 33C).

The de-energization of the relay 341 permits the jaws of the collet chuck 86 to be spring returned to a normal closed position with the pin and sleeve subassembly 42 held therebetween. As the collet chuck 86 is closed, the limit switch 349 is actuated to close the contact thereof and complete a circuit from the line 307 through the relay 351 to the line 303 to energize the relay. The energization of the relay 351 closes the normally open contact 351-1 to complete the circuit through now enclosed contact 347-4 through the relay 352 to energize the relay. Also, the energization of the relay 351 closes the normally open contact 351-2 to condition a circuit through the normally held open, now closed, contact 343-B, through the normally held closed, now open, contact 346-B and through the relay 353.

The energization of the relay 352 closes the normally open contact 352-1 to complete a circuit from the line 302 to the line 303 to energize a valve solenoid 394 to actuate the air cylinder 117 and return the pin and sleeve placement slide 116. As the slide 116 is withdrawn to the left, as viewed in FIG. 10, the limit switch 343 is actuated to hold close the contact 343-B and to hold open the contact 343-A. The closing of the contact 343-B completes the conditioned circuit through the now closed contact 311-5, and through the now closed contact 347-5 and through the relay 354 to the line 303 to energize the relay. (see FIG. 33C).

The energization of the relay 354 opens the normally closed contact 354-1 to disable the circuit through the relay 344 for controlling the advance of the insert ram 121 to de-energize the relay 344, and closes the normally open contact 354-2 to complete a circuit from the line 302 to the line 303 to energize a valve solenoid 396 for actuating the air cylinder 122 to move retractably the insert ram 121. (see FIG. 33G).

As the insert ram 121 is returned upwardly, the limit switch 346 is actuated to hold closed the contact 346-B to complete a circuit from the line 307, through the now held closed contact 343-B, through the now held closed contact 346-B and through the normally open, now closed, contact 351-2 and through the relay 353 to the line 303 to energize the relay. Also, the actuation of the limit switch 346 holds open the contact 346-A to disable the circuit through the time delay relay 347, the contacts of which open on delay. The energization of the relay 353 closes a normally open contact 353-1 to condition partially the all stations return circuit from the line 307 to the line 303. (see FIG. 33A).

It should be observed that after each indexing movement and the operation of the work tools at the work stations, and the subsequent closing of all of the contacts such as the normally open contacts 353-1 to complete the all stations return circuit from the line 307 to the line 303, that the index clutch 325 will be engaged to render effective the continuously running motor 330 to index the turntable 61.

Simultaneously, with the operation of the pin and sleeve subassembly feeding device 100 at the first work station, the closing of the contact 306-2 completes a circuit along the line 307 through a switch 361 and through the normally closed contact 312-2 to energize a solenoid 362 (refer to FIG. 33C) to actuate the air cylinders 135—135 to move downwardly, as viewed in FIG. 12, the upper hold-down bars 137—137 to clamp the wire 59 between the upper and lower hold-down bars. Moreover, the closing of the contact 326-4 completes a circuit through the normally closed contact 833-1 along the line 315 through the now closed contacts 321-2 and through the normally closed contact 366-2 of the time delay relay 366 and through the relay 363 to the line 303 to energize the relay.

The energization of the relay 363 closes a normally open contact 363-1 to complete a holding circuit from the line 315 to hold in the relay 366 after the on delay, time delay relay 366 is de-energized to instantaneously open the contact 366-1. Moreover, the energization of the relay 363 closes a normally open contact 363-2 to complete a circuit from the line 310, through a normally held closed contact 356-A of a limit switch 356, through the now closed contact 363-2 and through a relay 364 to the line 303 to energize the relay. Also, the energization of the relay 363 closes a contact 363-3, normally open, and completes a circuit through the normally closed contact 312-3 of the relay 312 to bypass the normally open contact 407-2 and through the on delay, time delay relay 366 and through valve solenoid 367 to the line 303 to energize the relay and the solenoid winding. (see FIG. 33H).

The energization of the solenoid 367 actuates the cylinder 144 to advance the wire stripping blade 141 to strip a predetermined length L of the wire 59 which is subsequently welded to the sleeve 48 of the pin and sleeve subassembly 42. As the blade 141 is moved upwardly and to the left, as viewed in FIG. 12, by the rod 143, the cam follower 145 traces the cam opening 146.

The energization of the on delay, time delay relay 366 closes, after a delay, normally open contact 366-1 too complete a circuit from the line 302 through to energize a solenoid 368 to operate an air blast device (not shown) to direct a stream of air against the insulation being removed from the wire 59. The energization of the time delay relay 366 also opens, on delay, a normally closed contact 366-2 to disable the circuit through the relay 363 to de-energize the relay and operate the air cylinder 144 to move the cam follower 145 and the blade 141 downwardly and to the right, as viewed in FIG. 12, to an unoperated position.

The closing of the contact 363-2 completes a circuit through from the line 307, and through a normally held closed limit switch contact 356 and through the relay 364 to the line 303 to energize the relay. The energization of the relay 364 closes a contact 364-1 to condition partially the full depth circuit through the latching relay 324. The energization of the relay 364 also closes a contact 364-2 to lock in the relay 364. Should the wire 59 be broken during the stripping operation, the tension on the wire 59 is released to permit a feeler to actuate a limit switch 356 to open the contact 356-A and simultaneously to hold closed the contact 356-B to complete a circuit from the line 307 to illuminate a lamp 357 to indicate a broken wire. (see FIGS. 12 and 32).

Figure 33A:
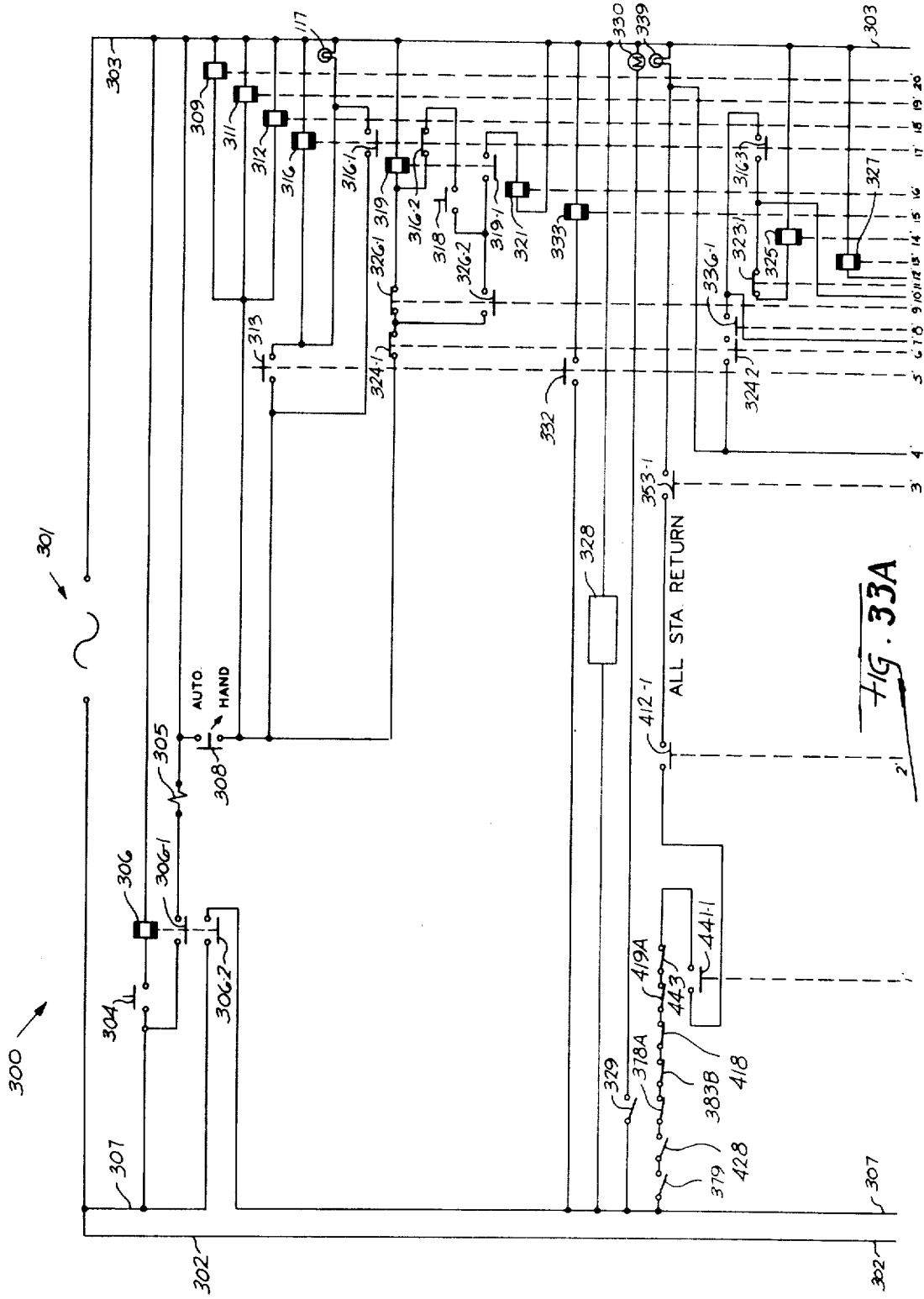
Figure 33B:
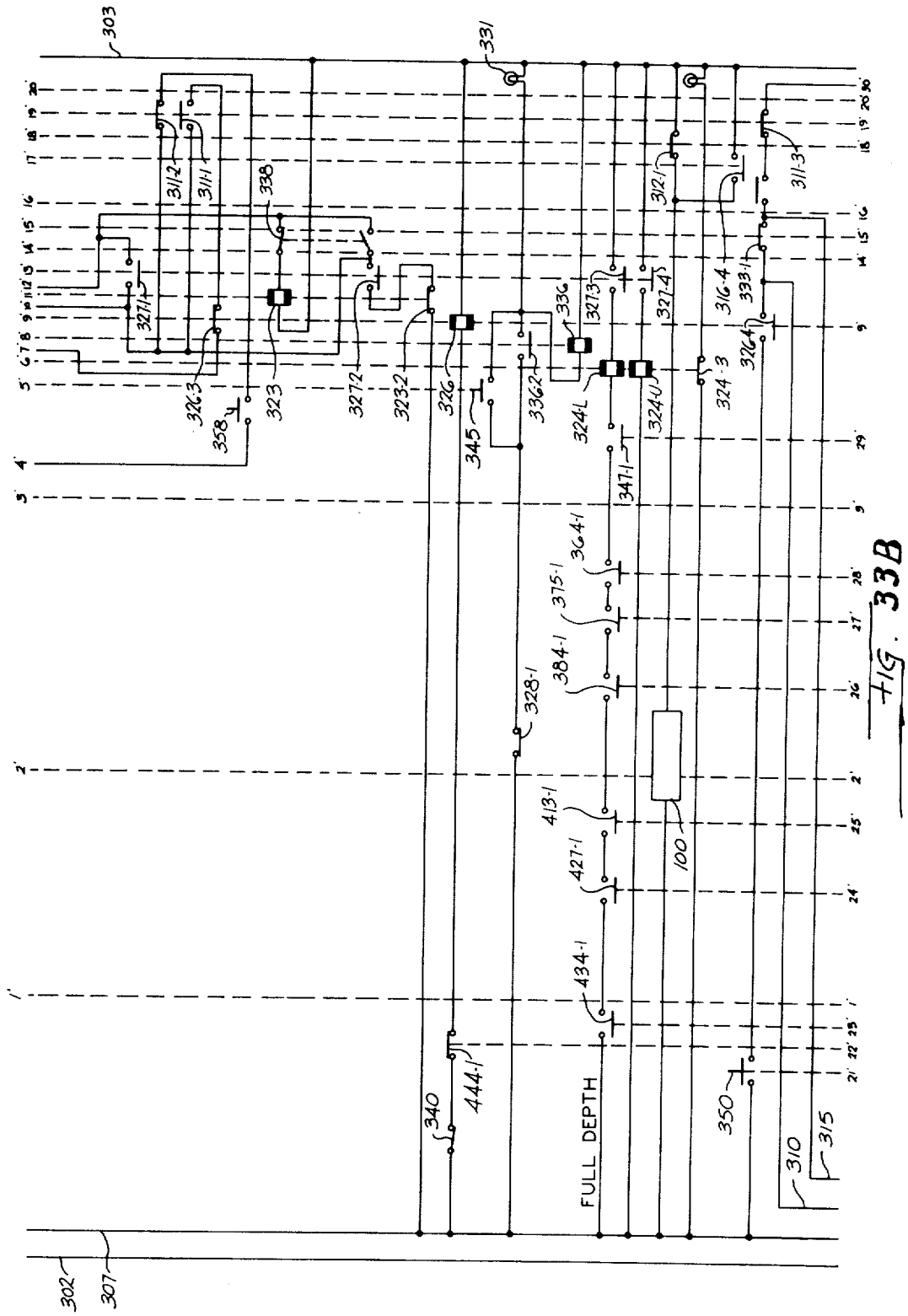
Figure 33D:
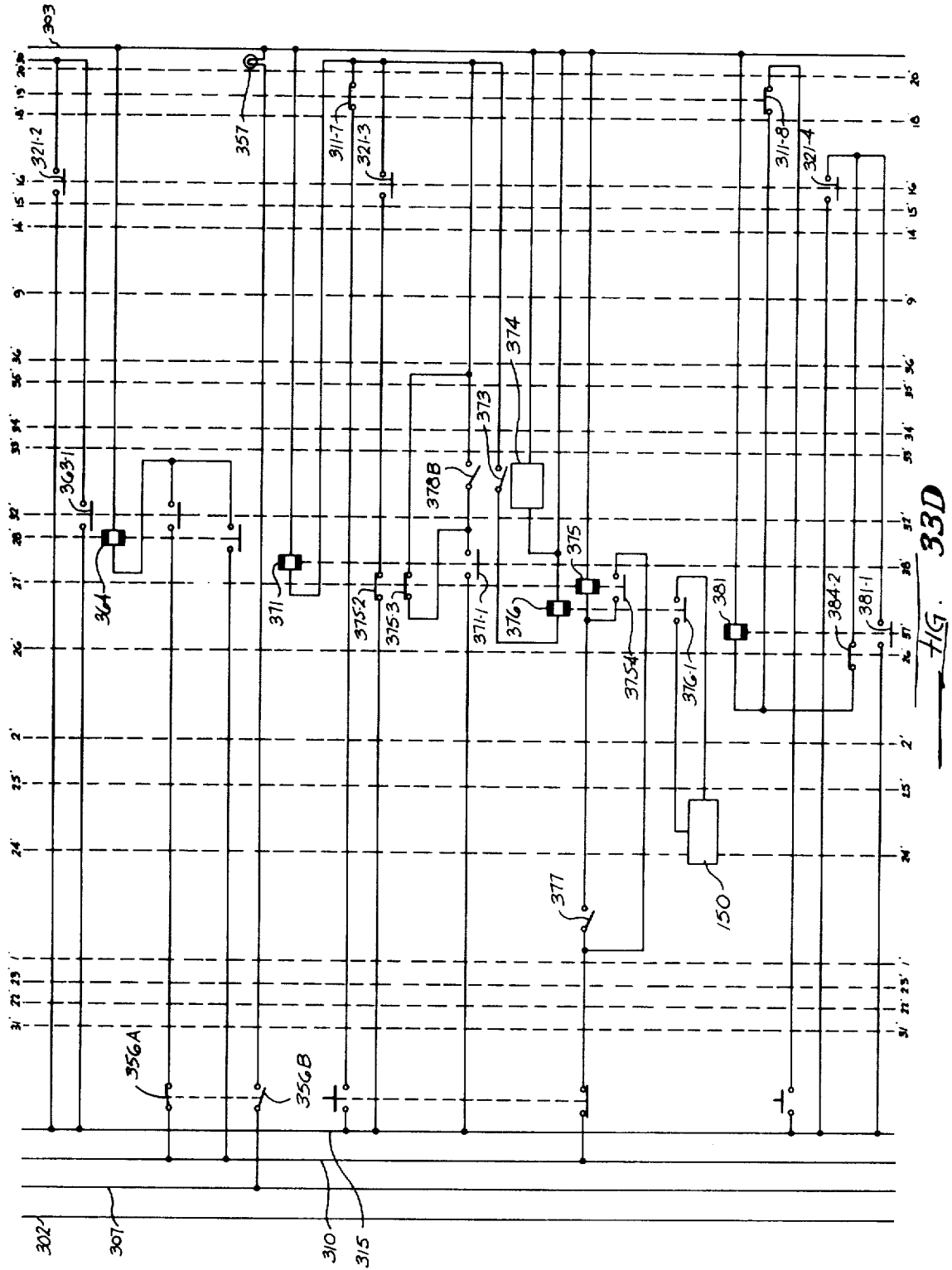

As can best be seen in FIG. 33D, the energization of the relay 321 and the closing of the normally open contact 321-3 completes a circuit from the source of power 301, along the line 302, through the now closed contact 326-4 and the normally closed contact 333-1, along the line 315, through a normally closed contact 375-2 and through the now closed contact 321-3, through the relay 371 and then back along the main line 303 to the source of power to energize the relay. The energization of the relay 371 closes a normally open contact 371-1 to lock in the relay, and to enable a circuit from the line 315, through the now closed contact 371-1 and a normally closed contact 375-3, through the contacts of limit switch 373 and through a counter 374 and a relay 376. (see FIG. 33D).

Moreover, the energization of the relay 371 closes a normally open contact 371-2 to complete a circuit from the line 302 to the line 303 to energize a solenoid 372 to actuate the air cylinder 163 (see FIG. 13) to advance the anvil electrode 151 into engagement with the sleeve 48 of the pin and sleeve subassembly 42 which is positioned in the workholder 63 currently in registration with the welding device 150. The movement of the anvil electrode 151 into engagement with the sleeve 48 actuates limit switch 373 (see FIG. 32) to close the contact thereof and complete a circuit from the line 315, through the now closed contact 371-1 and the normally closed contact 375-3 in the bypass circuit and through the counter 374 and the relay 376 to the line 303. The completion of the circuit through the relay 376 energizes the relay and closes a normally open contact 376-1 to cycle the welding electrode 152 into engagement with the stripped portion of the wire 59 and the sleeve 48 to weld the wire to the sleeve of the pin and sleeve subassembly 42. (see FIG. 33D).

As the welding electrode 152 is advanced into engagement with the wire 59, the welding electrode actuates limit switch 377 to close a normally open contact thereof and complete a circuit from the line 310 through the limit switch contact and the relay 375 to the line 303 to energize the relay. The energization of the relay 375 closes a contact 375-1 to condition partially the full depth circuit for the energization of the latching relay 324-L, and opens the normally closed contact 375-2 to disable the initiating circuit through the closed contact 321-3 for advancing the anvil electrode 151. The energization of the relay 375 opens the normally closed contact 375-3 to disable a circuit for holding in the relay 376 for cycling the welding electrode 152. Finally, the energization of the relay 375 closes a normally open contact 375-4 to complete a holding circuit for the relay 375. (see FIG. 33D).

To complete the cycle of the welding electrode 152, the welding electrode is returned to a normal retracted position. As the welding electrode 152 is moved to the left, as viewed in FIG. 13, the welding electrode actuates the limit switch 378. The actuation of the limit switch 378 holds closed a contact 378-A thereof to condition partially the all stations return circuit (see FIG. 33A) and holds open a contact 378-B thereof. Then the anvil electrode 151 is returned radially inward and to the right, as viewed in FIG. 13, and actuates the limit switch 379 to close the contact thereof to further condition partially the all stations return circuit through the indexing relay 324-L.

Simultaneously, with the feeding of a pin and sleeve subassembly 42 in the first work station and the feeding of the wire 59 and the welding of a stripped portion thereof to the sleeve 48 of another pin and sleeve subassembly 42 in registration with the welding device 150, the cutting device 170 is operated to sever the wire 59 at the third work station. Then a length of the wire 59 has a leading end welded to the pin and sleeve subassembly 42 in the fourth work station and the trailing and thereof held taut in the tensioning device 81 of the workholder in the fourth work station with a new leading end of the wire which continues to the supply spool 131 welded to the pin and sleeve subassembly in the third work station.

As can best be seen in FIG. 33D, the energization of the relay 321 and the closing of the contact 321-4 completes a circuit from the line 315, through the contact 321-4, through the normally closed contact 384-2 and through the relay 381 to the line 303 to energize the relay 381. The energization of the relay 381 closes a normally open contact 381-1 to complete a bypass circuit from the line 315 around the contact 321-4 to hold in the delay 381 after the initial push button switch 313 drops out. Moreover, the energization of the relay 381 also closes a normally open contact 381-2 to complete a circuit from the line 302 through a solenoid 382 to the line 303 to operate the air cylinder 179 to move the cutting blades 171—171 to sever the wire between the trailing end of one of the workholders 63—63 and the pin and sleeve subassembly 42 in the next successive one of the workholders. (see FIG. 33H).

As the cutting blades 171—171 are advanced toward each other to sever the wire 59, the cutting blade actuates the limit switch 383 to hold closed the normally open contact 383-A thereof. The closing of the contact 383-A completes a circuit from the line 310 through the relay 384 to the line 303 to energize the relay. The energization of the relay 384 closes a normally open contact 384-1 in the full depth circuit for energizing the relay 324-L and opens normally closed contact 384-2 to disable the circuit for advancing the wire cutting blades 171—171. Furthermore, the energization of the relay 384 also closes a normally open contact 384-3 to lock in a circuit from the line 310 for maintaining the relay energized. Finally, the energization of the relay 384 closes a normally open contact 384-4 to complete a circuit from the line 307, through the now closed contact 309-1, through the now closed contact 384-4 and through the relay 386 to the line 303 to energize the relay 386. The energization of the relay 386 closes the normally open contact 386-1 to complete a circuit from the line 302 through the solenoid 387 to energize the winding thereof to operate a valve and actuate the air cylinder 178 to return the cutting blades 171—171 to an unoperated condition. As the cutting blades 171—171 are returned to an unoperated condition, the limit switch 383 is actuated to open the contact 383-A and to close the contact 383-B to condition partially the circuit for the return of all stations for the next cycle of operation. After all stations have been returned to an unoperated position, the index clutch 325 is engaged and the turntable is indexed through an increment of rotation to advance each of the workholders 63—63 to the next successive work station.

Then, a leading one of the workholders 63—63 is moved with the turntable 61 in a clockwise direction, as viewed in FIG. 2, to position the pin and sleeve subassembly 42 in registration with the swaging device 190. As the air cylinder 178 of the cutting device 170 is actuated to sever the wire 59 at the third work station, the air cylinder 193 of the swaging device 190 is actuated to move the die 194 (see FIG. 16) downwardly and into engagement with the sleeve 48 of the pin and sleeve subassembly 42 in registration therewith. The die 194 swages the rim of the sleeve 48 to turn the peripheral edge thereof inwardly. Then, as the cylinder 178 is actuated to return the cutting blades 171—171 at the third work station, the air cylinder 193 is actuated to move the die 194 out of engagement with the pin and sleeve subassembly 42 so that the turntable 61 may be indexed.

Then as the turntable 61 is indexed in a clockwise direction, as viewed in FIG. 2, to move the leading one of the workholders 63—63 into the fifth work station, the cam follower 78 on the distributor arm 74 follows the lowered contoured configuration of the annular cam surface 69 to permit the spring 79 to move pivotally the distributor arm in a downward direction. Simultaneously therewith, the pinion 92 on the lower portion of the shaft 91 engages the entrance teeth on the rack 94 (see FIG. 18) beneath the turntable 61. As the turntable 61 is indexed, the pinion 92 cooperates with the rack 94 to turn the shaft 91 and hence the chuck 86 with the pin and sleeve subassembly 42 held therein. Then, as the height of the cam surface 69 increases and as the turntable 61 is indexed to advance the leading one of the workholders into the sixth work station, the trailing end of the distributor arm 74 is moved upwardly to distribute a second layer of convolutions of the wire 59 on the sleeve 48 as the pin and sleeve subassembly 42 is rotated with the chuck 86.

It should be observed that while the distribution of the wire 59 is made on the sleeve 48, the wire extending from the sleeve 48 is tensioned by the tensioning device 81 at the trailing end of the workholder 63. As the pinion 92 disengages from the rack 94 beneath the turntable 61, the chuck 86 and the pin and sleeve subassembly 42 are no longer rotated within the workholder 63 and, simultaneously therewith, the annular cam surface 69 assumes a level configuration so that the distributor arm 74 is no longer moved pivotally but is maintained by the spring 79 in a position generally somewhat above with the platform 68. At the close of the wire distribution cycle, the turntable 61 has been indexed to advance the pin and sleeve subassembly 42 with the wire 59 distributed on the sleeve 48 thereof into the sixth work station where one of a mass of the shell and cap subassemblies 43—43 is assembled to the pin and sleeve subassembly.

At the sixth work station, if successive ones of the shell and cap subassemblies 43—43 are fed from the bowl feeder 211 and backed up on the inclined track, the light beam from a photoelectric unit 401 (see FIG. 33E) is broken and a normally open contact 401-1 holds open a circuit which, when closed, operates the bowl feeder. Then, as the shell and cap subassemblies 43—43 are assembled to the pin and sleeve subassemblies 42—42, the shell and cap subassemblies move downwardly along the track 212 and the light beam is no longer interrupted. The photoelectric unit is actuated to close the contact 401-1 to complete a circuit from the line 307 to the line 303 to operate the bowl feeder 211 to feed additional ones of the mass of the shell and cap subassemblies 43-43 down the track 212.

As can best be seen in FIG. 33, the closing of the contact 326—4 completes a circuit through the normally closed contact 333-1 and along the line 315, through the now closed contact 321-5, and through the normally closed contact 406-1 and then through the relay 402 to the line 303 to energize the relay. The energization of the relay 402 closes normally open contact 402-1 to complete a bypass circuit around the contact 321-5 for holding in the relay 402. Also, the energization of the relay 402 closes a normally open contact 402-2 to complete a circuit from the line 302 to the line 303 to energize a valve solenoid 403. The valve solenoid 403 actuates the air cylinder 224 to move the slide 229 with one of the shell and cap subassemblies held therein radially inward.

As the slide 229 is moved radially inward to insert a shell and cap subassembly 43 in the nest 231 aligned beneath the assembly ram 238, the bracket 226 on the slide trips limit switch 404 to hold closed a limit switch contact 404-A and complete a circuit from the line 307 through the now closed contact 404-A and through the relay 406 to the line 303 to energize the relay. The actuation of the limit switch 404 also holds open a contact 404-B to disable a circuit for the energization of a relay 407 and the relay 412.

The energization of the relay 406 opens the normally closed contact 406-1 to disable the circuit holding in the relay 402 for advancing the slide 229, and closes the normally open contact 406-2 to complete a bypass circuit from the line 307 through the now closed contact 326-5 to lock in the relay 406. The energization of the relay 406 also closes normally open contact 406-3 to enable a circuit through the contact 404-B of the limit switch 404, which is operated on the return stroke of the slide 229, through the normally closed contact 413-2, and through the normally closed contact 333-6, a normally closed contact 414-1 and through the relay 407 to the line 303. Further, the energization of the relay 406 closes normally open contact 406-4 to enable a circuit from the line 310 through the relay 413 to the line 303, and closes normally open contact 406-5 to complete a circuit from the line 302 to the line 303 to energize the solenoid 408 to operate the air cylinder 224 to return the shell placement slide 229 radially outward leaving the shell and cap subassembly held beneath the assembly ram 238 in the nest 231.

The return movement of the shell placement slide 229 causes the bracket 226 to operate the limit switch 404 to hold open the contact 404-A and to hold closed the contact 404-B. The closing of the contact 404-B completes a circuit from the line 307, through the now closed contact 406-3, through the relay 407 to the line 303 to energize the relay. Moreover, as the slide 229 is moved to the left, as viewed in FIGS. 19 and 22, the pin 221 is withdrawn from the opening 237 in the feed track 212 so that the next successive shell and cap subassembly 43 is no longer supported by the pin and drops into the slide 229. The escapement member 218 is urged in a clockwise direction by the spring 219 to move the lip 217 under the next successive one of the pin and sleeve subassemblies 43—43 in the track 212.

The energization of the relay 407 closes a normally open contact 407-1 to complete a circuit from the line 302 through a solenoid 409 to the line 303 to energize the winding of the solenoid and operate the air cylinder 234 to drive the block 233 downwardly and then to move the assembly ram 238 further downwardly to drive the shell and cap subassembly 43 held in the nest 231 into engagement with the pin and sleeve subassembly 42. The energization of the relay 407 also closes a normally open contact 407-2 to complete a circuit from the line 302, through the now closed contact 363-3 and through the contact 407-2 to energize the solenoid 367 to advance the stripping device 200 to strip a portion of the wire 59 near the trailing end thereof. As the stripping device 200 completes a path of motion of, first, into engagement with the wire 59, and then along the length thereof, the stripping device actuates the limit switch 418 to return the stripping device to an unoperated position. (see FIG. 33A).

Also, a bypass circuit is completed through the time delay relay 366 to energize the relay and close a contact 366-1 to energize the solenoid 368 to open a valve (not shown) and direct a blast of air against the wire to force the stripped insulation material away from the wire 59.

Figure 33E:
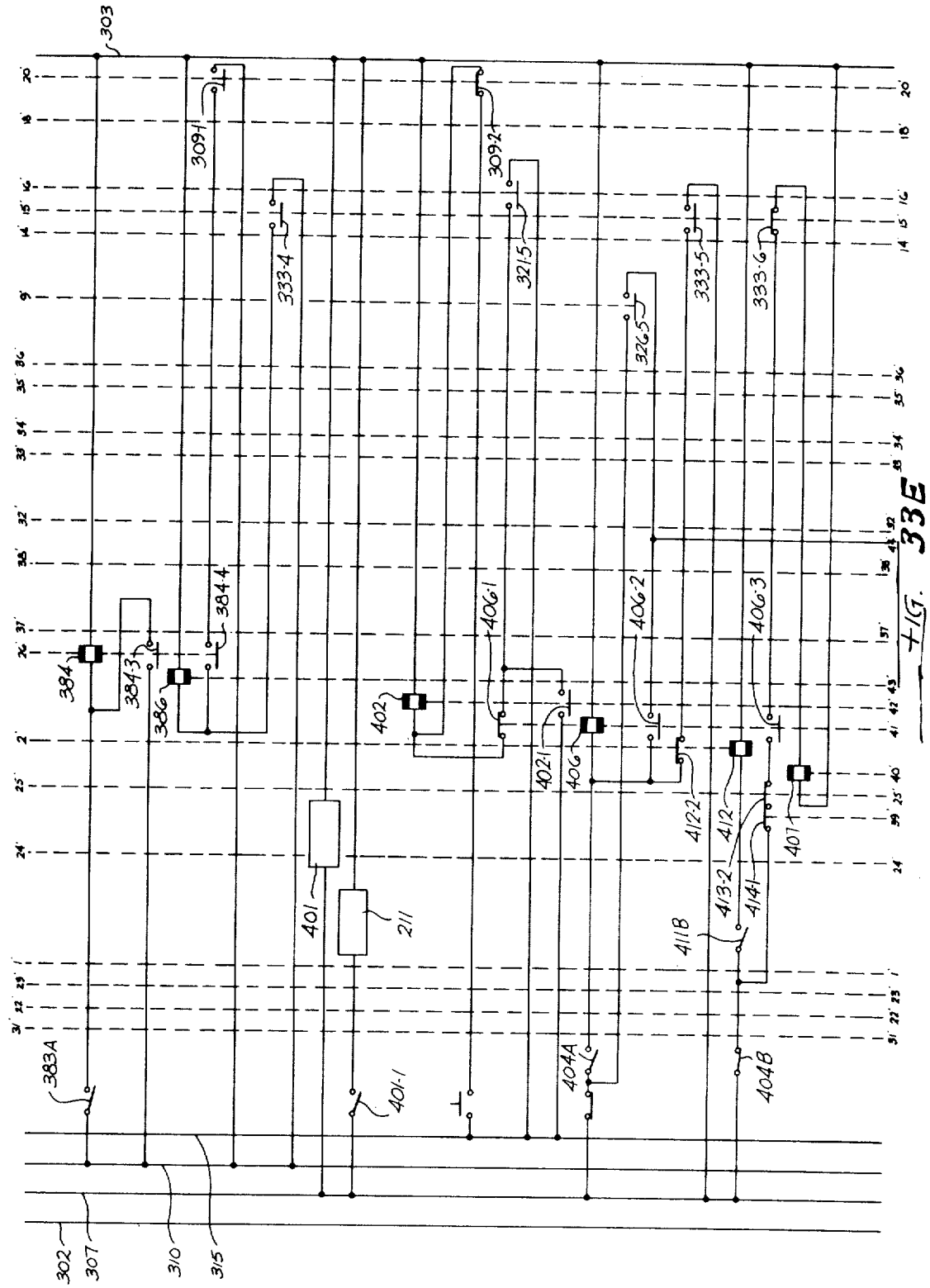
Figure 33H:
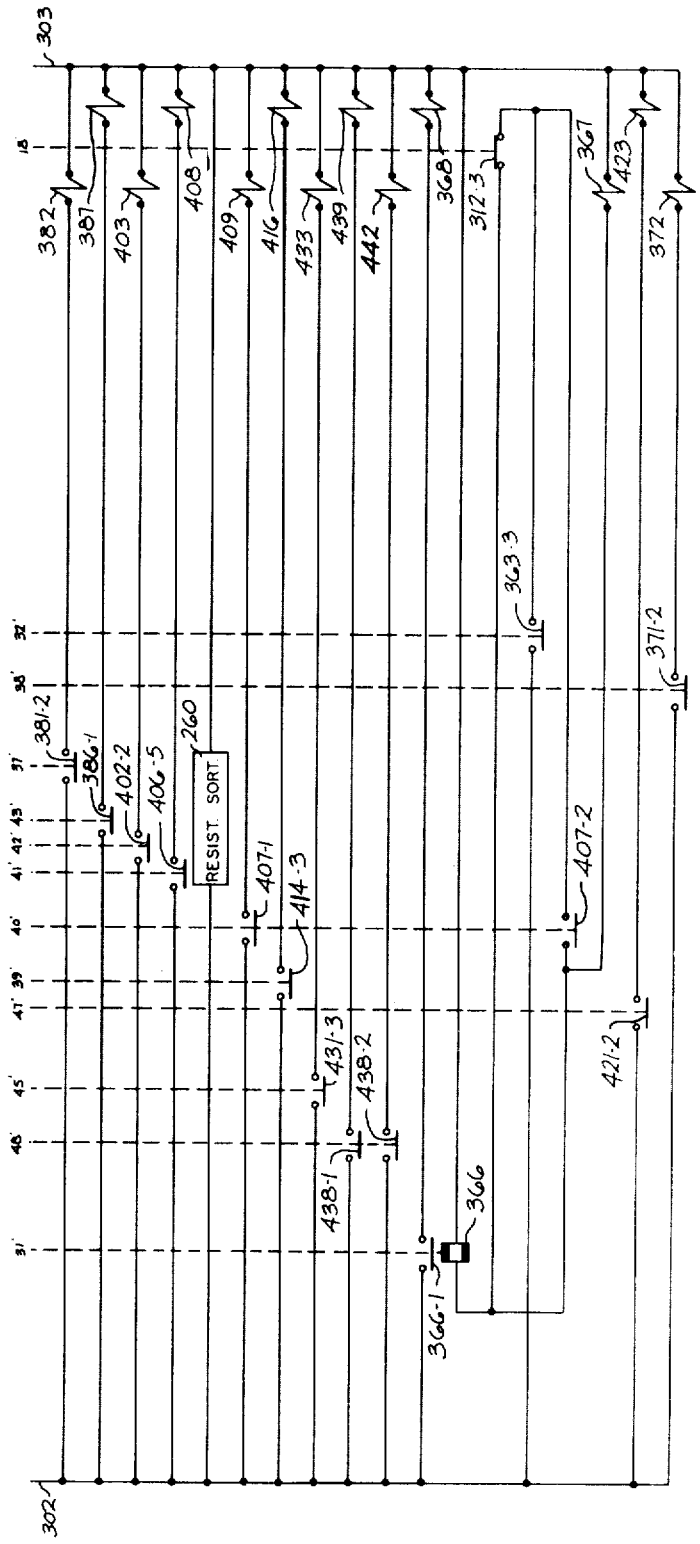

As the assembly ram 238 is moved downwardly, the assembly ram operates a limit switch 411 (see FIG. 32) to hold closed a contact 411-A to complete a circuit from the line 310 through relay 413 to energize the relay (see FIG. 33E). The energization of the relay 413 closes a normally open contact 413-1 to condition partially the circuit for all stations return, and opens a contact 413-2 to disable the circuit through the relay 407 for advancing the assembly ram 238. The energization of the relay 413 also closes a contact 413-3 to lock in the relay 413 and closes a contact 413-4 to complete a circuit from the line 307 through the now closed contact 309-3 and through the relay 414 to the line 303 to energize the relay.

The energization of the relay 414 opens a normally open contact 414-1 to further disable the circuit through the relay 407, and closes a normally open contact 414-2 to complete a circuit from the line 307 through the now closed contact 306-5 and through the relay 414 to hold in the relay 414. The energization of the relay 414 also closes a normally closed contact 414-3 to complete a circuit from the line 302 to the line 303 to energize a solenoid 416. The solenoid 416 is responsive to the energization thereof the actuate the air cylinder 234 to return the assembly ram 238 upwardly, as viewed in FIG. 19, to an unoperated position.

As the assembly ram 238 is moved upwardly, the assembly ram actuates the limit switch 411 to close the normally open contact 411-B. The closing of the contact 411-B completes a circuit from the line 303, through the limit switch contact 404-B, through the now closed contact 411-B and through the relay 412 to the line 303 to energize the relay. (see FIG. 33E).

The energization of the relay 412 closes the normally open contact 412-1 to condition the all stations return circuit to enable the relay 325 to be engaged. Also, the energization of the relay 412 opens normally open contact 412-2 to disable a circuit from the line 307 through the normally open contact 333-5.

At the seventh station, the bared portion of the trailing end of the wire 59 is welded to the cap 56 of the shell and cap subassembly 43 in the workholder 63. As can be seen in FIG. 33, the energization of the relay 321 and the closing of the contact 321-6 and the closing of the contact 326-4 completes a circuit from the line 315, through normally closed contact 427-4, through the now closed contact 321-6 and through the relay 421 to the line 303 to energize the relay. (see FIG. 33F).

The energization of the relay 421 closes a contact 421-1 to enable a circuit from the line 315, through the now closed contact 421-1, through a normally closed contact 427-2 to lock in the relay 421 and to condition a circuit through a contact of the limit switch 424 and through the relay 422. Also, the energization of the relay 421 closes a normally open contact 421-2 to complete a circuit from the line 302 to the line 303 to energize a solenoid winding 423 to operate the air cylinder 254 to move the anvil electrode 251 into engagement with the cap 56. As the anvil electrode 251 is moved radially outward to engage the cap 56, the anvil electrode actuates the limit switch 424. The actuation of the limit switch 424 holds the contact thereof closed to complete a circuit through the relay 422 to energize the relay.

The energization of the relay 422 closes a contact 422-1 to cycle the welding electrode 248 and advance the welding electrode into engagement with the wire 59 to engage the wire with the cap 56 of the shell and cap subassembly 43 which is in registration with the welding and weld test device 240. As the welding electrode 248 is advanced into engagement with the wire 59, the welding electrode actuates a limit switch 426 to close the contact thereof and complete a circuit from the line 315 through the relay 427 to the line 303 to energize the relay. (see FIG. 33E).

The energization of the relay 427 closes a normally open contact 427-1 to condition the full depth circuit, and opens a normally closed contact 427-2 to disable a circuit through the relay 421 and the relay 422. Moreover, the energization of the relay 427 closes a normally open contact 427-3 to bypass the limit switch contact 426 to hold in the relay 427. Also, the energization of the relay 427 opens a normally closed contact 427-4 to disable the circuit through the normally open contact 321-6. As the welding electrode 248 is cycled and returned to an unoperated position, the actuator bracket 253 actuates a limit switch 419 to close a contact 419-A thereof to condition the circuit for all stations return and opens a contact 419-B. The anvil electrode 241 is returned to an unoperated position and actuates the limit switch 428 to further condition the all stations return circuit.

As the welding electrode 248 is returned toward the up-operated position, the pawl 257, which has been moved pivotally out of the slot 256 by the magnetic field established by the welding of the wire 59 to the cap 56, engages the wire (see FIG. 25). Then, as the welding electrode 241 is moved further toward the unoperated position, the pawl 257 imparts a pulling force to the wire. If the strength of the weld of the wire 59 to the cap 56 is acceptable, the wire is broken at the weld; if it is unacceptable, the wire is pulled out of engagement with the cap 56.

After the trailing end of the wire 59 has been welded to the cap 56, the pin and sleeve subassembly is indexed to an eight and final work station where an electrical characteristic of the heat coil assembly 41 is determined and where the heat coil assembly is sorted in accordance with the electrical characteristic. As can best be seen in FIG. 33, the closing of the contact 326-4 to place current on the line 315 completes a circuit through the contact 321-7, closed during the initial time of each cycle, and the normally closed contact 437-1 and through the relay 431 to the line 303 to energize the relay.

The energization of the relay 431 closes a normally open contact 431-1 to bypass the temporarily closed contact 321-7 to lock in the relay 431, and closes a normally open contact 431-2 to condition a circuit through a contact of a limit switch 432 and through an on delay, time delay relay 434. Also, the energization of the relay 431 closes a normally open contact 431-3 to complete a circuit from the line 302 to the line 303 and through a solenoid 433 to operate the solenoid to operate the air cylinder 266 to move the collet chuck 261 downwardly over the heat coil assembly 41 currently in registration with the testing and sorting device 260.

The descent of the collect chuck 261 actuates the limit switch 436 to hold closed a contact 436-L of the limit switch to complete circuit from the line 310 through the on delay, time delay relay 437 to the line 303 to energize the relay. The energization of the time delay relay 437, on delay, opens a contact 437-1 to disable the circuit through the relay 431 and closes a contact 437-2 to bypass the limit switch 436.

The energization of the relay 437 also closes, on delay, a normally open contact 437-3 to complete a circuit from the line 307 through the now closed contact 309-6 and normally closed contact 441-3 and then through the relay 438 to the line 303 to energize the relay, and closes a contact 437-4 to condition a circuit through the on delay, time delay relay 434.

The energization of the relay 438 closes a contact 438-1 to energize a solenoid 439 to operate the air cylinder 276 to return to the collect chuck 261, and closes a normally open contact 438-2 to energize a solenoid 442 to actuate the air cylinder 270 to simultaneously open the collect chuck 86 to permit the collect chuck 261 to withdraw and the heat coil assembly 41 therefrom. As the collect chuck 261 is returned to an original position, the stud 271 actuates the limit switch 436 to close the contact 436-U thereof and complete a circuit from the line 307 through the relay 441 to the line 303 to energize the relay. (see FIG. 33G).

The energization of the relay 441 closes the normally open contact 441-1 in the all stations return circuit, and closes the contact 441-2 to condition a circuit through the instantaneous closing contact 437-4, and through the relay 434. Finally, the energization of the relay 441 opens the contact 441-3 to open the circuit through the relay 438 to de-energize the relay. The opening of the collet chuck 86 in the workholder 63 actuates the limit switch 432 to complete a circuit from the line 310 through the contact 737-4, through the now closed contact 441-2, through the now held closed contact of the limit switch and through the on delay, time delay relay 434 to energize time delay relay. (see FIG. 33G). The energization of the relay 434 closes a contact 434-1 to condition the full depth circuit, and closes instantaneously a normally open contact 434-2 to lock in the relay 434 after the air cylinder 270 is no longer operated to hold open the collect chuck 86 and the limit switch 432 is returned to an unoperated condition to open the contact thereof. (see FIG. 33G).

As the collect chuck 261 is returned to the upper position, the upper end of the collect chuck is forced against the stationary pin 273 so that the stationary pin causes the chuck to open and permit the heat coil assembly 41 to descend therefrom by gravity. It will be recalled that an electrical characteristic of the heat coil assembly 41 is determined when the chuck 261 is in a lower position with the grounding electrode 272 engaging the chuck 86. Simultaneously, the circuit through the relay 366 causes the relay to operate the solenoid 368 (see FIG. 33H) to not only pulse an air blast at the wire stripping stations, but also at the testing and sorting device 260 to urge the heat coil 41 which has fallen from the open collet 261 into an accepted bin 275 or a reject bin 276. (See FIG. 26).

Then, as the chuck 86 is closed after the heat coil assembly 10 is released therefrom, the air cylinder 270 actuates a limit switch 443 to complete the all stations return circuit (see FIG. 33A) from the line 307 to the line 303 whereupon the index clutch relay 325 is engaged to actuate the index clutch solenoid 359 to engage the index clutch (not shown) to permit the turntable 61 to be rotated indexably for another cycle of automatic operation.

As the turntable 61 is indexed to move the workholder 63 currently positioned in registration with the testing and sorting station 260 toward the pin and sleeve subassembly feed device 100, the chuck 86 is moved adjacent to, but spaced below a limit switch 446. (see FIGS. 1 and 32) Should the heat coil assembly 41 not be removed from the workholder 63 at the testing and sorting device 260, the heat coil assembly engages and actuates the limit switch 446 to complete circuit paths in the electrical circuit 300 to discontinue operation of the welding device 240.

And, finally, as the turntable 61 is indexed to move the workholder 63 from the testing and sorting device 260 to the feeding device 100, the scrap wire discarding device 277 engages the tensioning device 81 to force open the groove therein to permit an air blast from the tube 279 to direct the scrap wire away from the workholder.

What is claimed is:

1. An apparatus for automatically assembling successive ones of a plurality of first parts with successive ones of a plurality of second parts and for securing an insulated wire between the first and second parts of each of the assemblies of the first and second parts, which comprises:

an indexable turntable having a plurality of workholders spaced about the periphery thereof, said workholders having facilities holding the first parts;

a first feeding device for advancing successive ones of a group of the first parts to successive ones of the workholders;

means for supplying insulated wire;

a wire feeding device for advancing successive sections of the insulated wire from the supply thereof into engagement with successive ones of the first parts in successive workholders;

means for stripping insulation from successive portions of the wire which are moved into engagement with the successive ones of the first parts in the successive workholders;

means for bonding the successive bared portions of the wire to the first parts;

means for feeding successive ones of a group of the second parts from a supply thereof into securing engagement with successive ones of the first parts in successive ones of the workholders;

means for severing successive lengths of the wire extending from the supply thereof and bonded to successive ones of the first parts in successives one of the workholders and bonded to successive preceding ones of the first parts in preceding ones of the workholders, the severing taking place in the portion of the wire extending between the bonds of the portion of the wire to the first parts adjacent to the subsequent one of the two associated first parts;

means for tensioning successive portions of successive lengths of wire extending from successive ones of said preceding first parts subsequent to the severing operation;

means for rotating successive ones of said preceding first parts while the successive associated lengths of wire bonded thereto are held taut in order to wind the wire on the successive preceding first parts;

means for stripping a portion of the insulation from each successive section of the wire secured to and extending from each successive ones of the preceding first parts;

means for bonding successive stripped portions of the successive lengths of the wire extending from the successive preceding first parts to successive associated ones of the second parts;

means including a pivotally mounted pawl for testing the strength of the bond of the wire to each of the successive second parts;

means for mounting the pawl for transverse and longitudinal movement to engage successive portions of wire extending between the successive second parts and the tensioning means;

the means for bonding successive portions of the length of wire to the successive second parts establishing a magnetic field which causes the pawl on said testing device to pivot into an extended position extending transversely of the longitudinal path of travel of the testing means;

means for causing the testing means to move longitudinally transversely of the successive portions of the wire welded to the successive second parts so that the extended pawl will be caused to engage the successive sections of wire extending between the associated bonds of the wire to the associated second parts and tensioning means to exert a pulling force thereto to test the welds and break the successive portions of the wire attached thereto;

means for withdrawing successive ones of the assemblies of the first and second parts from the workholders;

means for determining an electrical test characteristic of successive ones of the withdrawn assemblies of first and second parts, and means for assorting successive ones of the tested assemblies in accordance with the test characteristic.

2. An apparatus having a plurality of work stations for assembling successive ones of a plurality of first parts with successive ones of a plurality of second parts and for bonding an insulated wire between the first and the second parts of each of the assemblies of the first and second parts, all automatically, which comprises:

a plurality of rotatable means, each having an initial oriented position to facilitate the rotation thereof for holding successive ones of the first parts;

means positioned at a first work station for feeding successive ones of the first parts to the rotatable means;

a supply of wire;

means positioned at a second one of the work stations for removing the insulation from a portion of the wire and for advancing the wire to move the portion thereof into juxtaposition with successive ones of the first parts in the rotatable means with the wire extending to the supply thereof;

means positioned at the second one of the work stations for holding successive portions of the wire in engagement with the successive ones of the first parts and for bonding the successive portions of the wire to successive ones of the first parts;

means for orienting successive rotatable means into initial oriented positions;

means positioned at a third one of the work stations for severing successive lengths of the wire extending from the supply thereof with successive leading ends of the successive lengths of wire bonded to the leading one of the first parts and with the wire extending to the supply thereof and the successive new leading ends bonded to the successive succeeding ones of the first parts;

means for tensioning the length of wire extending from the successive succeeding leading ones of the first parts and for distributing successive sections of the length of wire on the first part as the first part is moved rotatably with the rotatable holding means;

means responsive to the advancement of the rotatable means for rotating the holding means to wind the wire on the first part;

means rendered effective subsequent to the winding of the successive lengths of the wire on the first successive succeeding ones of the first parts for removing the insulation from other portions of the successive lengths of wire between the first part and the tensioning means;

means positioned at a fourth one of the work stations for assembling successive ones of the second parts to successive ones of the first parts;

means for moving the tensioning means to engage successive other portions of the wire with successive ones of the second parts;

means positioned at a fifth one of the work stations and mounted to move along a longitudinal path of travel transverse of the length of wire extending from the first part for bonding a first side of the successive other portions of the wire to successive ones of the second parts;

means mounted pivotally on the bonding means and retracted when engaged by the wire as the bonding means is moved in a first direction to bond the wire to the second part and the pivotally mounted means is moved to the opposite side of the wire and above the second part and subsequently moved pivotally transverse of the path of travel of the bonding means for engaging the wire and exerting a pulling force thereon to test the strength of the bond;

means for supplying bonding energy to the bonding means and for causing the engaging means to move pivotally transverse of successive succeeding lengths of wire extending from successive ones of the second parts to the tensioning means;

means for retracting the bonding and engaging means to cause the engaging means to strike the successive lengths of wire to test the bond and to break the wire at the bond thereof of successive ones of the second parts;

means positioned at a sixth one of the work stations rendered effective subsequent to the breaking of the wire at the bond for removing successive succeeding ones of the assemblies from the holding means and for determining an electrical test characteristic thereof to facilitate sorting of the electrical component;

conveying means supporting the holding means for advancing each of the holding means successively through each of the work stations;

means responsive to the performance of work by the means at each of the work stations for indexing the conveying means to advance each of the holding means into the next successive work station, and means responsive to predetermined positioning of the various elements of the apparatus for causing automatic operation thereof.

3. An apparatus having a plurality of work stations for assembling automatically successive ones of a plurality of first parts into successive ones of a plurality of second parts and for bonding an insulated wire between the first and the second parts of each of the assemblies of the first and second parts, which comprises:

a plurality of work stations;

a plurality of means for holding successive ones of the first parts;

means positioned at a first one of the work stations for feeding successive ones of the first parts to successive ones of the holding means;

a supply of wire;

means positioned at a second one of the work stations for removing the insulation from spaced portions of the wire extending to the supply thereof and for advancing the wire to move successive ones of the spaced portions into juxtaposition transversely with successive ones of the first parts in successive ones of the rotatable means;

first bonding means positioned at the second one of the work stations for holding successive sections of the wire from which the insulation has been removed into engagement with the successive ones of the first parts and for bonding the successive portions of the wire to successive ones of the first parts against which they are held which includes an electrode having a concave arcuate surface adapted to partially circumscribe the first part and having spaced slots extending through the concave arcuate surface to receive the portions of wire positioned in juxtaposition with successive ones of the first parts to position the wire on the first part and to confine the wire between the associated first part and the concave arcuate surface;

means positioned at a third one of the work stations for swaging successive ones of the first parts and for breaking successive lengths of the wire extending from the supply thereof past and bonded to successive associated first parts and extending from said successive associated first parts to and bonded to successive associated preceding ones of the first parts, the breaking of each length of wire occurring between the associated first parts immediately adjacent to the subsequent one thereof;

means rendered effective when the bond of the wire to associated first parts is defective for severing the wire extending from the supply thereof past and bonded to successive associated first parts and extending from said successive associated first parts to and bonded to a preceding one of the first parts, the severing occurring between the associated first parts and adjacent to the subsequent one thereof;

means for tensioning the length of wire extending from the successive preceding ones of the first parts;

means positioned at a fourth work station for removing insulation from successive portions of the successive severed lengths of wire extending between the first part and the tensioning means and for assembling successive ones of the second parts to successive ones of the first parts;

means for moving the tensioning means to a position substantially axially of the successive first parts to cause the wire extending between the successive associated first parts and the tensioning means into juxtaposition with the successive associated second parts;

second bonding means positioned at a fifth one of the work stations and mounted to move along a longitudinal path of travel transversely of the length of wire extending from the first part to the tensioning means for bonding the portion of the successive associated sections of the wire from which the insulation has been removed to successive associated ones of the second parts;

retractable engaging means mounted pivotally on the second bonding means movable transversely of and caused to engage the wire extending from the tensioning means to the successive associated first parts and caused to be retracted from an extended position when engaged by the successive portions of wire extending between the tensioning means and the successive associated first parts as the bonding means is moved in a first direction and extended to bond the successive associated sections of the wire to the successive associated second parts as the pivotally mounted means is moved in a longitudinal path of travel to the opposite side of the successive associated sections of wire extending from the successive associated second parts to the tensioning means and subsequently moved pivotally transverse of the longitudinal path of travel thereof into an extended position for engaging the wire when the bonding means is retracted;

means for supplying bonding energy to the bonding means and for causing the engaging means to move pivotally transverse of the successive lengths of wire extending from the successive associated second parts to the tensioning means;

means for retracting the bonding means and the engaging means to cause the extended engaging means to strike the wire to test the successive bonds and to break the wire at the successive associated bonds thereof to the successive associated second parts;

means responsive to the completion of the various operations at the work stations for indexing each of the holding means to the next succeeding work station, and means responsive to predetermined positioning of the various elements of apparatus for causing automatic operation thereof.

4. An apparatus for attaching an insulated wire from a supply thereof to successive ones of a plurality of first parts and for winding the wire on the successive ones of the first parts, which comprises:

means for holding the first parts;

means secured to said holding means for turning said holding means;

means for supplying the wire;

means for removing the insulation from a leading and successive spaced portions of the wire extending from the supply thereof;

means for advancing the bared leading portion of the wire into engagement with the first part and successive spaced portions thereof with successives ones of the first parts with the wire extending to the wire supply means;

means for bonding the bared leading portion of the wire to the first part and for bonding a next successive bared portion to a next successive first part;

means for severing successive lengths of the wire with the leading portion bonded to the first part and with new leading portions thereof bonded to successive succeeding ones of the first parts;

means mounted on the holding means for tensioning the lengths of wire;

imparting means for engaging the turning means and imparting rotary motion to the turning means to rotate the holding means;

orienting means engaging the turning means for orienting the turning means to facilitate engagement thereof with the imparting means, and means for advancing the turning means into engagement with the imparting means and for advancing further the turning means along the imparting means to rotate the holding means to wind the successive lengths of the wire on the associated successive ones of the first parts held therein.

* * * * *

UNITED STATES PATENT OFFICE
CERTIFICATE OF CORRECTION

Patent No. 3,706,122      Dated December 19, 1972

Inventor(s) THOMAS A. LA VALLE

It is certified that error appears in the above-identified patent and that said Letters Patent are hereby corrected as shown below:

In the specification, Column 2, line 27, insert following first word "part" --while severing the wire at the joint and then orienting the part--. Column 3, line 54, "13" should read --13-13--. Column 8, line 36, "81" should read --82--. Column 8, line 57, "85" should read --86--. Column 12, line 50, "2" should read --62--. Column 15, line 27, "word" should read --work--. Column 15, line 60, "tool" should read --spool--. Column 16, line 15, "52" should read --62--. Column 16, line 30, delete [from]. Column 18, line 6, "operating" should read --operation--. Column 19, line 32, "42" should read --48--. Column 19, line 32, "48" should read --42--. Column 19, line 36, "assembly" should read --subassembly--. Column 20, line 9, "speed" should read --head--. Column 21, line 33, "62" should read --82--. Column 21, line 54, "253" should read --263--. Column 21, line 54, "264" should read --263--. Column 21, line 57, "downward" should read --downwardly--. Column 22, line 14, "a" should read --an--. Column 24, line 42, "counter" should read --contact--. Column 27, line 2, "42" should read --422--. Column 27, line 36, "696" should read --396--. Column 28, line 58, "306" should read --307--. Column 29, line 25, insert --delay-- following the word "time. Column 31, line 8, "collect" should read --collet--. Column 31, line 25, "new" should read --now--. Column 32, line 6, "enclosed" should read --closed--. Column 32, line 67, "833-1" should read --333-1--. Column 33, line 6, "366" should read --263--. Column 38, line 36, "306-5" should read --326-5--. Column 40, line 14, "collect" should read --collet--. Column 40, line 32, "collect" should read --collet--. Column 40, line 52, "737-4" should read --437-4. Column 40, line 60, "collect" should read --collet--.

Signed and sealed this 3rd day of June 1975.

(SEAL)
Attest:

RUTH C. MASON
Attesting Officer

C. MARSHALL DANN
Commissioner of Patents
and Trademarks